(12) United States Patent
Shiino

(10) Patent No.: US 6,669,562 B1
(45) Date of Patent: Dec. 30, 2003

(54) GAME DEVICE

(75) Inventor: Masamitsu Shiino, Tokyo (JP)

(73) Assignee: Sega Corporation (JP)

( * ) Notice: Subject to any disclaimer, the term of this patent is extended or adjusted under 35 U.S.C. 154(b) by 113 days.

(21) Appl. No.: 09/831,168

(22) PCT Filed: Sep. 8, 2000

(86) PCT No.: PCT/JP00/06174
§ 371 (c)(1),
(2), (4) Date: Jun. 25, 2001

(87) PCT Pub. No.: WO01/17627
PCT Pub. Date: Mar. 15, 2001

(30) Foreign Application Priority Data

| Sep. 8, 1999 | (JP) | 11/254938 |
| Jan. 21, 2000 | (JP) | 2000/13549 |

(51) Int. Cl.⁷ .............................................. A63F 13/00
(52) U.S. Cl. ............................... 463/31; 463/30; 463/7; 434/307 R; 434/157; 434/227
(58) Field of Search .............................. 463/36–38, 31; 273/148 R, 148 B; 434/227–233, 156–157, 307 R, 308, 365, 228–230, 118

(56) References Cited

U.S. PATENT DOCUMENTS 4,850,591 A * 7/1989 Takezawa et al. ............. 463/37

OTHER PUBLICATIONS

Typing Tutor 7, Davidson & Associates, Inc and Simon & Schuster, 1996 [http://support.selectsoftusa.com/manuals/typing7.htm], pp. 1–13.*
JPO English translation of JP09–167258.*
JPO English translation of JP11–015589.*

* cited by examiner

*Primary Examiner*—Mark Sager
*Assistant Examiner*—Aaron Capron
(74) *Attorney, Agent, or Firm*—Dickstein Shapiro Morin & Oshinsky LLP

(57) ABSTRACT

A game device is provided for executing a game involving competition of typing skills wherein specified words that are required to be input are not fixed with respect to game characters, in other words, displayed enemies. The game device includes control means for executing a program; geometry calculating means for performing co-ordinate conversions for a plurality of polygons constituting enemy characters; and rendering processing means for generating display images by converting the three-dimensional co-ordinates generated by said geometry calculating means into two-dimensional co-ordinates. A characteristic feature is that, according to the program executed and controlled by said control means, a word box corresponding to an enemy character is generated and a specified word prompting a typing input by a player is displayed in said word box.

20 Claims, 22 Drawing Sheets

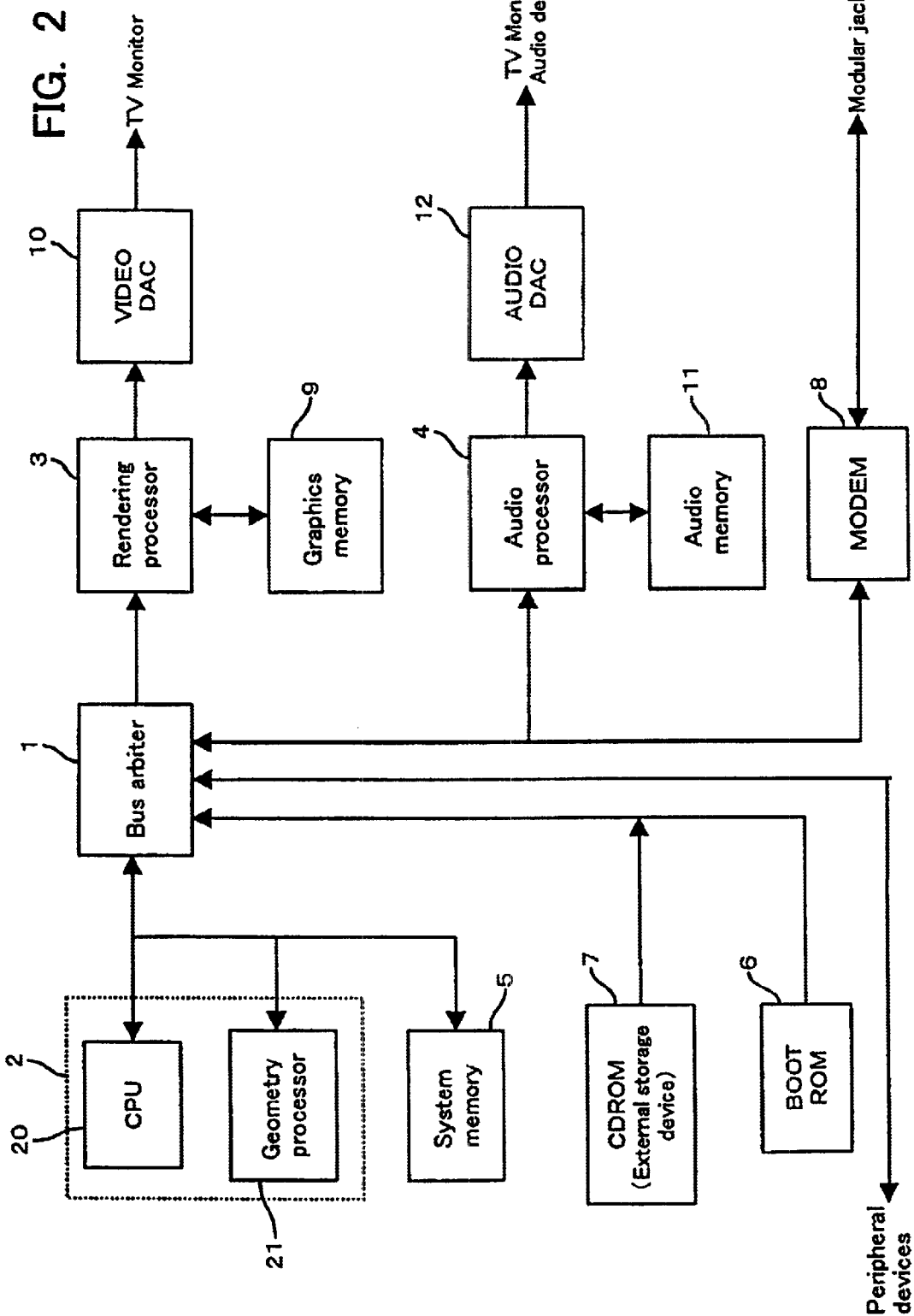

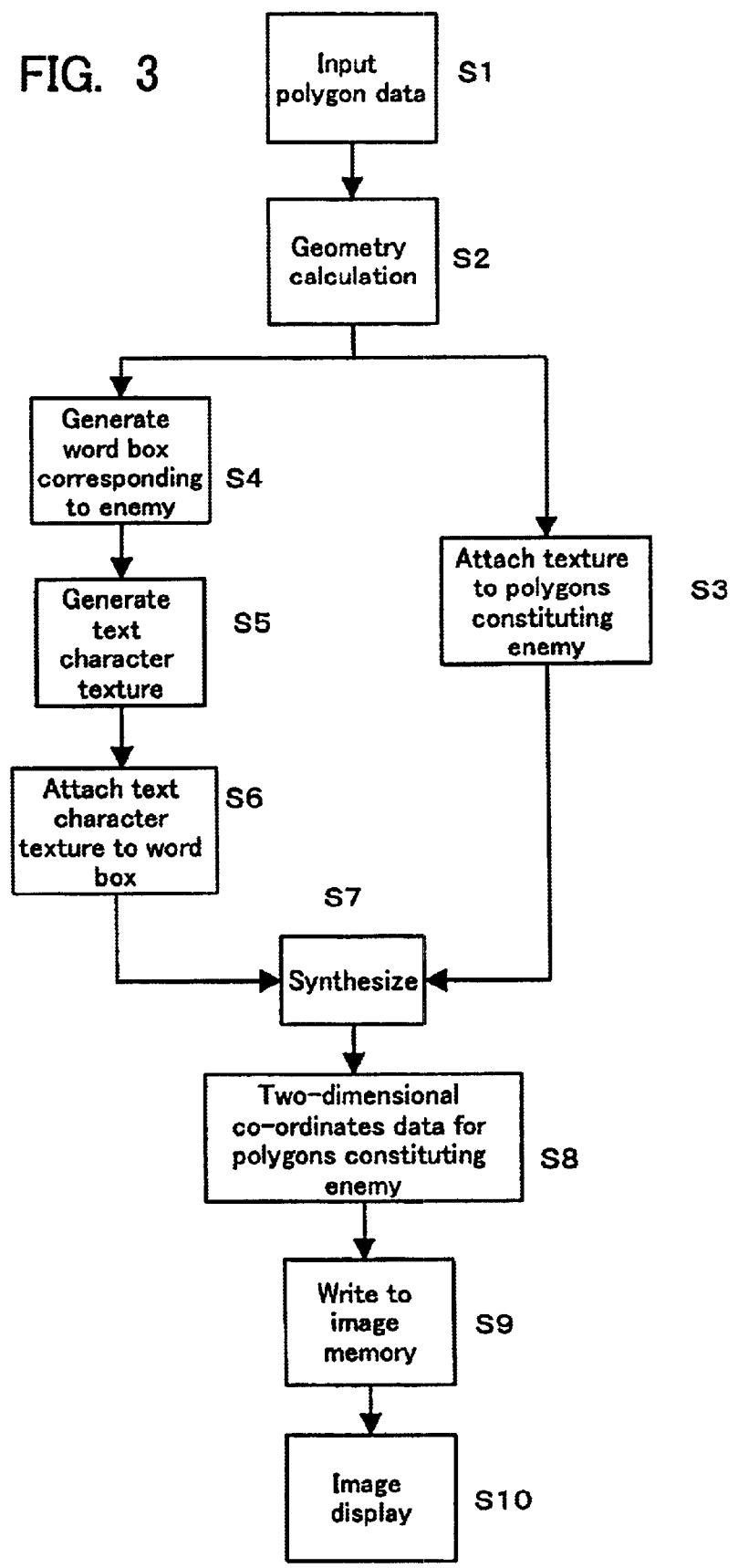

FIG. 9

| Input phase | State of word box | State of enemy |
|---|---|---|
| 1: Initial state | 硫黄<br>IOU | |
| 2: Press "I" key | 硫黄<br>OU<br><br>Delete "I" in *Romaji* word<br>※*Romaji* word does not remain centered | OW! |
| 3: Press "O" key | 硫黄<br>U<br><br>Delete O in *Romaji* word | AHHHH!<br>Receives more damage |
| 4: Press "U" key | 硫黄<br><br>Delete U in *Romaji* word<br>State with *Romaji* word deleted maintained for about 0.5 to 1 second | EEARGGH!<br>Enemy dead |
| Word box deletion method | 硫黄 | Method 1<br>Gradually faded out (transparency increased), or flashing state maintained for short while and then faded out |
| | | Method 2<br>Word box explodes at phase 4 (at moment that final character is input, polygon to which word is attached breaks up and scatters radially.) |

| STANDARD KANA CHARACTERS | | | | | | | | | | | | | | | | |
|---|---|---|---|---|---|---|---|---|---|---|---|---|---|---|---|---|
| KANA CHARACTER | あ | か | さ | た | な | は | ま | や | ら | わ | が | ざ | だ | ば | ぱ | ん |
| ROMA-ji | A 5 | KA 8 | SA 8 | TA 8 | NA 8 | HA 8 | MA 8 | YA 8 | RA 8 | WA 9 | GA 9 | ZA 9 | DA 8 | BA 8 | PA 8 | NN 9 |
| HEPBURN METHOD | | | | | | | | | | | | | | | | |
| OTHER | | | | | | | | | | | | | | | | N 9 |
| い | I 6 | き KI 9 | し SI 9 | ち TI 9 | に NI 9 | ひ HI 9 | み MI 9 | | り RI 9 | うぃ WI 10 | ぎ GI 10 | じ ZI 10 | ぢ DI 10 | び BI 9 | ぴ PI 9 | |
| | | | SHI 9 | CHI 9 | | | | | | | | JI 10 | | | | |
| う | U 6 | く KU 9 | す SU 9 | つ TU 9 | ぬ NU 9 | ふ HU 9 | む MU 9 | ゆ YU 10 | る RU 9 | | ぐ GU 9 | ず ZU 9 | づ DU 10 | ぶ BU 9 | ぷ PU 9 | |
| | | | | TSU 9 | | FU 9 | | | | | | | | | | |
| え | E 6 | け KE 9 | せ SE 9 | て TE 9 | ね NE 9 | へ HE 9 | め ME 9 | | れ RE 9 | うぇ WE 10 | げ GE 9 | ぜ ZE 11 | で DE 9 | べ BE 9 | ぺ PE 9 | |
| お | O 6 | こ KO 9 | そ SO 9 | と TO 9 | の NO 9 | ほ HO 9 | も MO 9 | よ YO 10 | ろ RO 9 | を WO 10 | ご GO 9 | ぞ ZO 11 | ど DO 9 | ぼ BO 9 | ぽ PO 9 | |

{ 11, 0, "愛", "¥x51¥x52" },
{ 11, 0, "ＯＬ", "¥xBA¥xB7" },
{ 13, 0, "穴", "¥x51¥x65" },
{ 14, 0, "汗", "¥x51¥x6B" },
{ 14, 0, "灰", "¥x6A¥x52" },
{ 14, 0, "蛾", "¥x51¥x78" },
{ 14, 0, "あざ", "¥x51¥x83" },
{ 14, 0, "餌", "¥x54¥x6B" },
{ 14, 0, "網", "¥x51¥x70" },
{ 14, 0, "エラ", "¥x54¥x77" },
{ 14, 0, "蝿", "¥x6A¥x54" },
{ 15, 0, "牛", "¥x53¥x5C" },
{ 15, 0, "鬼", "¥x55¥x66" },
{ 15, 0, "恋", "¥x5A¥x52" },
{ 15, 0, "塩", "¥x5C¥x65" },
{ 15, 0, "椅子", "¥x52¥x5D" },
{ 15, 0, "杭", "¥x58¥x52" },
{ 15, 0, "井戸", "¥x52¥x8C" },
..............................
..............................

{ 50, 0, "やっかい払い", "¥x74¥x99¥x56¥x52¥x8D¥x77¥x52" },
{ 50, 0, "心配性", "¥x5C¥x97¥x92¥x52¥x0A¥x53" },
{ 50, 0, "財布のひも", "¥x5B¥x52¥x6C¥x69¥x6B¥x73" },
{ 50, 0, "びた一文", "¥x8E¥x60¥x62¥x61¥x73¥x97" },
{ 50, 0, "失楽園", "¥x5C¥x62¥x77¥x58¥x54¥x97" },
{ 50, 0, "出来そこない", "¥x8B¥x57¥x5F¥x5A¥x65¥x52" },
{ 50, 0, "鳴り物入り", "¥x65¥x78¥x73¥x69¥x52¥x78" },
{ 50, 0, "いちもくさん", "¥x52¥x61¥x73¥x58¥x6B¥x97" },
{ 50, 0, "おねだり妻", "¥x55¥x68¥x88¥x78¥x8A¥x6F" },
{ 50, 0, "左うちわ", "¥x6B¥x88¥x78¥x53¥x61¥x7C" },
{ 50, 0, "昼あんどん", "¥x6B¥x79¥x51¥x97¥x8C¥x97" },
{ 50, 0, "へっぴり腰", "¥x6D¥x99¥x93¥x78¥x82¥x5C" },
{ 50, 0, "酒の肴", "¥x5B¥x69¥x69¥x5B¥x56¥x65" },
{ 50, 0, "象の墓場", "¥x87¥x53¥x69¥x6A¥x56¥x8D" },
{ 50, 0, "不慮の事故", "¥x6C¥x3C¥x69¥x84¥x6A" },

Subroutine for moving word indication box to within screen

GAME DEVICE

TECHNICAL FIELD

The present invention relates to a game device, and more particularly to a game device for executing a game involving a competition of typing skills.

BACKGROUND ART

Various types of input devices are used as input means for game devices using computers, such as joysticks, key sticks, light guns, and the like, according to the contents of the game.

Amongst these, there exist computer-based game devices for executing a game involving competition of typing skills, in other words, typing speed and accuracy, or generic information processing devices devised such that they execute a typing game program, (hereinafter, simply called "game devices",) which use a keyboard as an input device.

In general, prescribed words are displayed in relation to a character, in other words, a competition opponent, shown on a display screen (hereinafter, called an 'enemy' in the present invention). Typing corresponding to the displayed words is input from the keyboard device, and if a player inputs the correct text corresponding to a prescribed number of words in a prescribed period of time, then he or she is able to defeat the enemy.

Moreover, when a certain enemy has been defeated, a further, different enemy character is displayed, and words associated with that enemy are displayed. Thereby, the player is able to input text via the keyboard device, similarly to the foregoing. By repeating these operations, the player is either able to continue playing the game, or is obliged to end the game, depending on whether or not he or she has defeated a prescribed number of enemies.

In a conventional device, rather than displaying an attack on the enemy for each text character that is input, it is judged whether or not the input text is correct and an attack on the enemy is only displayed for the first time when input of all the text has been completed. Whilst this is acceptable if considered for use as a rapid practice method for keyboard skills, it is lacking in excitement and novelty in terms of its characteristics as a game.

Moreover, if a plurality of enemies are displayed, and the enemy against whom the attack is directed can be switched during input of the text, then in a conventional device, a player has been able to return the text input to an initial state by intentionally inputting incorrect text. In this case, a penalty is applied in the game for the incorrect input. However, despite the fact that this incorrect input is not a reflection of the player's actual skills, it is generally accepted that a penalty is applied to the player in the game.

Moreover, when one enemy is defeated, a subsequent, different enemy is displayed, but these enemies are stationary, rather than animated, and the specified words that must be input for the enemies are the same for each respective enemy. As a result of this, the game becomes monotonous, and since the specified words that must be input are fixed, there is a high possibility that the same specified words required for input will be repeated as the game continues. Therefore, it is possible that the player will lose interest in the game itself.

DISCLOSURE OF THE INVENTION

In view of the foregoing, it is an object of the present invention to provide a game device executing a game involving competition of typing skills, which provides enhanced game characteristics.

Moreover, the present invention provides a game device executing a game involving competition of typing skills, wherein specified words which must be input are not fixed with respect to game characters, namely, to displayed enemies.

In order to achieve the aforementioned objects, the present invention comprises: control means for executing a program; geometry calculating means for performing co-ordinate conversions of a plurality of polygons constituting an enemy character forming an embodiment of the present invention (hereinafter, simply called "enemy character"); and rendering processing means for generating a display image by converting the three-dimensional co-ordinates generated by the geometry calculating means, to two-dimensional co-ordinates.

According to the program executed and controlled by said control means, an operation instruction display region corresponding to the enemy character, namely, in an embodiment of the invention, a box indicating a word (hereinafter, simply called "word indication box") is generated by a polygon, in an embodiment of the invention, and a specified word prompting typing input by a player (in addition to text characters, this may also contain symbols, or the like; the same applying to the subsequent description of the present invention) is displayed in the word instruction box polygon.

Desirably, according to the program executed and controlled by said control means, the display priority of the word instruction box polygon in the depth direction is set higher than the display priority of the corresponding enemy character in the depth direction, in such a manner that the word instruction box polygon is displayed in front of the corresponding enemy character on the screen.

Moreover, desirably, according to the program executed and controlled by said control means, if the display positions of a plurality of enemy characters are overlapping, then the display priorities in the depth direction of the plurality of word instruction box polygons corresponding respectively to the plurality of enemy characters are set higher than the display priorities in the depth direction of the plurality of enemy characters, and the display positions of the plurality of word instruction box polygons are controlled in such a manner that they do not overlap mutually beyond a prescribed amount.

Furthermore, desirably, alphabetical characters indicating the reading of the specified words displayed in the word instruction box polygons are appended thereto, the control means determines a match thereof with the alphabetical characters input by a player, and if the match meets prescribed conditions, then prescribed changes are applied to the display of the enemy character corresponding to the word instruction box polygon, according to the program executed and controlled by the control means.

Moreover, desirably, said control means performs control in such a manner that, when the first alphabetical character of the alphabetical characters displaying the reading of a specified word applied as texture to an word instruction box polygons is input, the enemy character corresponding to the word instruction box polygon is identified as an attack enemy character, and subsequent typing input is only considered as valid with respect to the specified word of the word instruction box polygon corresponding to the identified enemy character.

Furthermore, desirably, the prescribed conditions are cases where the typing input is correct for an individual specified word, or for each character of the alphabetical characters indicating the reading of the specified word.

Moreover, desirably, the conditions are cases where, if the input corresponds to any of the different combinations of alphabetical characters indicating the reading of the specified word, the input made by the player and the alphabetical characters indicating the reading of the specified word are judged to be matching, and when the same specified word is displayed in an word instruction box polygon at a subsequent juncture, the alphabetical characters input by the player are set as the alphabetical characters indicating the reading of the specified word.

Furthermore, desirably, a table of difficulty level numbers corresponding to kana characters is provided, and the difficulty level of a specified word is taken as the number given by summing the difficulty level numbers corresponding to the respective kana characters which form the reading of the specified word, according to the program executed and controlled by the control means.

Moreover, desirably, in the development of the game, if the typing input made by the player with respect to a specified word having a reading of a first difficulty level number is correct, then the specified word displayed subsequently is selected at random from a group of specified words having a difficulty level number that is not smaller than the first difficult level number.

Furthermore, desirably, the word instruction box polygon is generated in such a manner that that it follows the movement of the corresponding enemy character, according to the program executed and controlled by said control means, and when converting the co-ordinates to two-dimensional co-ordinates, the display priority of said word instruction box polygon in the depth direction is set to a maximum value, or, at the least, to a specific value which is greater than the display priority of said enemy character in the depth direction.

Furthermore, desirably, when the word instruction box polygons follow the movement of the corresponding enemy characters, then in cases where an enemy character moves in a non-linear fashion, the corresponding word instruction box polygon is controlled in such a manner that it moves along a linear path of travel linking the movement start position and the movement end position of the enemy character.

Moreover, desirably, the upper, lower, left-hand and right-hand edges of the display region on the screen as obtained by converting the word instruction box polygons to two-dimensional co-ordinates, are located in such a manner that a space of a prescribed number of dots or above is provided and displayed respectively at the upper, lower, left-hand and right-hand edges of the screen.

Further features of the present invention will become apparent from the embodiments of the invention described below with reference to the accompanying drawings.

BRIEF DESCRIPTION OF THE DRAWINGS

FIG. 2 is a functional block diagram of one compositional example of a game device for executing a game involving competition of keyboard typing skills, in other words, typing speed and accuracy, according to the present invention illustrated in FIG. 1;

FIG. 3 is an operational flow chart for displaying an enemy according to the present invention, as executed by the game device having the composition illustrated in FIG. 2;

FIG. 9 is a diagram showing one example of the changes in the display of an enemy, in accordance with text character input corresponding to the specified word shown in the word indication box polygon in FIG. 8 above;

FIG. 12 a table indicating a difficulty level for each standard kana character, by means of a number;

FIG. 13 is a diagram showing one section of a specified word list;

BEST MODE FOR CARRYING OUT THE INVENTION

Figure 1A:
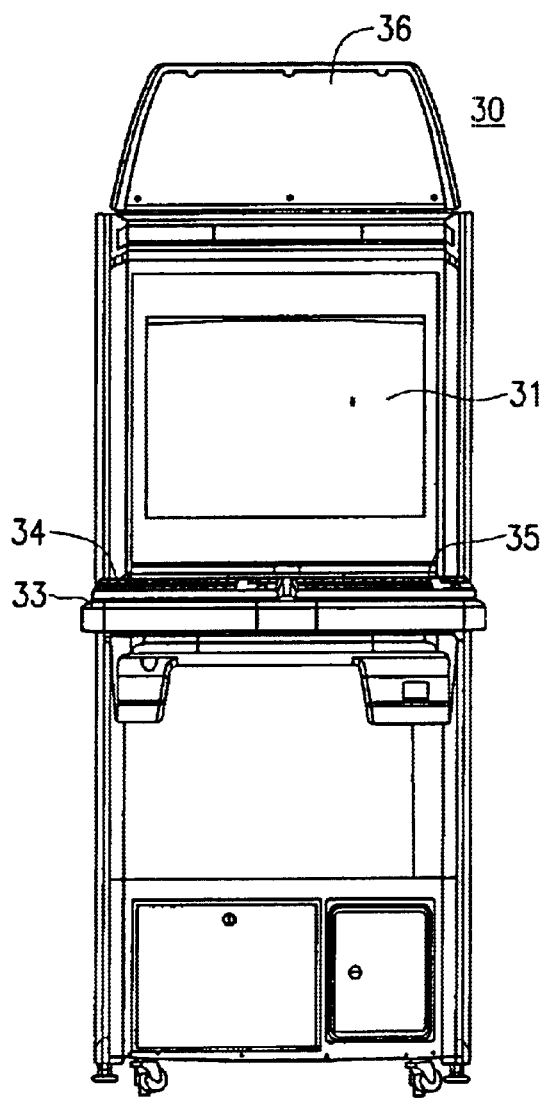
FIGS. 1(a) and 1(b) depict side and plan views of one compositional example of a game device for executing a game involving competition of keyboard typing skills, in other words, typing speed and accuracy, according to the present invention.

Embodiments of the present invention are described below with reference to the drawings. In the drawings, the same or similar items are labelled with the same reference numerals or reference symbols.

Figure 1B:
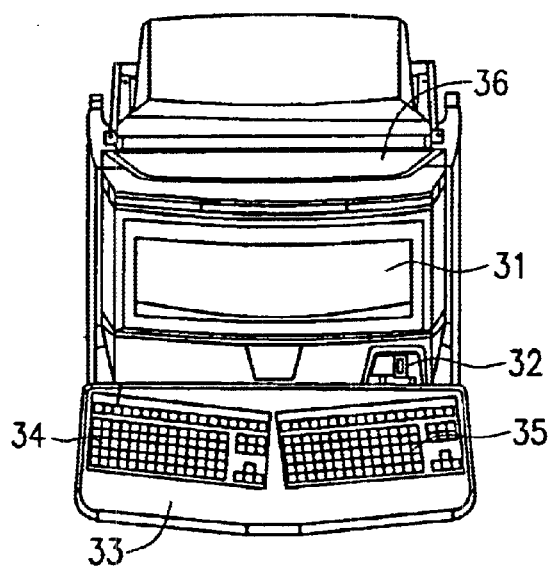

FIG. 1A and FIG. 1B are general views of one composition of a game device for executing a game involving competition of keyboard typing skills, in other words, typing speed and accuracy, according to the present invention: FIG. 1A is a side view and FIG. 1B is a plan view.

In these diagrams, a game device 30 comprises a game device main unit having a display unit 31 for displaying images on the front upper portion thereof, and, constituted separately from this game device main unit, a pair of input devices 34, 35 affixed to an operating panel section 33 provided at the front of the device.

The pair of input devices 34, 35 are constituted by keyboards having, at least, a number of keys corresponding to the right and left-hand fingers of a player, namely 10 keys, or more. Moreover, the pair of input devices 34, 35 are located in a shallow V-shaped configuration, in such a manner that, if the game is executed by two players, then both players can readily face the screen of the display unit 31.

The reason for the aforementioned disposition of the pair of input devices 34, 35 is as follows. Namely, it is difficult from the viewpoint of strength to provide a large number of key buttons directly on the game device main unit. In particular, in the case of a commercial game device where the input means is disposed in a horizontal position, the more distantly positioned keys are difficult to operate. Therefore, by taking ease of operation into account, whilst also maintaining strength, in the composition in FIG. 1, the input devices 34, 35 are disposed and attached, as separate members, to the game device main unit. Thereby, theft prevention, improved operability, and safety of the input devices 34, 35 are assured.

Moreover, a coin input opening 32 is provided in the rear face of the pair of input devices 34, 35. Furthermore, an advertisement panel 36 providing a simple introduction to the game contents is provided in the upper portion of the device main unit.

By pressing prescribed operation confirmation input keys on the keyboards 34, 35, in accordance with the images shown on the display 31, a one-player game or two-player game is selected, or a game start is implemented.

A prescribed game fee is inserted via the coin input opening 32, and a one-player or two-player game is selected by means of a confirmation input key. When the confirmation input key is pressed again, a game start is confirmed and a game is executed according to the one-player or two-player game selection.

When implementation of a game is started, then a specified word is displayed in a word indication box shown in a position corresponding to the enemy on the display 31.

Therefore, as described below in more detail, the player inputs typing via a keyboard 34, 35 corresponding to the alphabetical characters of the specified word. If prescribed conditions are satisfied in this typing input, then the enemy is defeated. Thereby, the player is able to recognize his or her own typing skill during the course of the game.

FIG. 2 is a functional block diagram of one compositional example of a game device for executing a game involving competition of keyboard typing skills, in other words, speed and accuracy of typing, according to the present invention as illustrated in FIG. 1A and FIG. 1B.

A controller section 2, rendering processor 3 and audio processor 4 are connected via a bus, the occupancy of which is controlled by a bus arbiter 1. Moreover, a system memory 5 is connected to a bus connected to the control section 2. Moreover, the bus arbiter 1 is also connected to a boot ROM 6, and a CD-ROM 7 forming an external storage device.

Furthermore, signals are exchanged with external devices by means of a modem 8, as and when necessary. The bus arbiter 1 is also connected to peripheral devices, such a keyboard devices, and the like.

The control section 2 comprises a CPU 20 forming control means, and a geometry processor 21 for performing dedicated co-ordinates conversion processing, in order to reduce the load on the CPU 20.

The rendering processor 3 performing rendering processes, such as applying texture, or the like, is connected to a graphics memory 9 which temporarily stores image data. The output of the rendering processor 3 is displayed on a video monitor (not illustrated), by means of a video signal DA converter 10.

On the other hand, the audio processor 4 is connected to an audio memory 11, and the output of the audio processor 4 is connected to a video monitor or audio device (not illustrated), by means of an audio signal DA converter 12.

FIG. 3 is an operational flow diagram for displaying an enemy according to the present invention, in a game involving competition of typing skills, in other words, typing speed and accuracy, using a keyboard device as an input device, as executed by a game device having the composition illustrated in FIG. 2.

The operational sequence is implemented by means of the CPU 20 executing and controlling a game program read from the external storage device 7 to the system memory 5.

In FIG. 2, when the power supply of the game device is switched on, the CPU 20 reads in a game program from the CD-ROM 7 to the system memory 5, according to a boot program stored in the boot ROM 6.

Consequently, according to the game program read in to the system memory 5, the CPU 20 inputs polygon data for composing an enemy and instructs the geometry processor 21 to perform co-ordinates conversion (step S1).

The geometry processor 21 converts polygon data based on global co-ordinates to viewpoint co-ordinates (step S2).

In this way, the polygon data constituting the enemy thus converted to viewpoint co-ordinates data is transferred to the rendering processor 3, where texture is attached to the respective polygons forming the enemy, in accordance with the polygon data (step S3).

Texture data corresponding to the polygon data is read out from a texture memory (not illustrated), and is laid over the polygons and then stored in the graphics memory 9.

According to the present invention, a word indication box polygon frame is generated representing a word indication area having a prescribed positional relationship in the three-dimensional space with respect to the enemy (step S4). Moreover, text characters are generated to constitute a specified word generated by logic described hereinafter, and a text character texture is generated by means of the generated text characters (step S5).

Thereupon, the text character texture is attached to the aforementioned word polygon frame (step S6).

Figure 4:
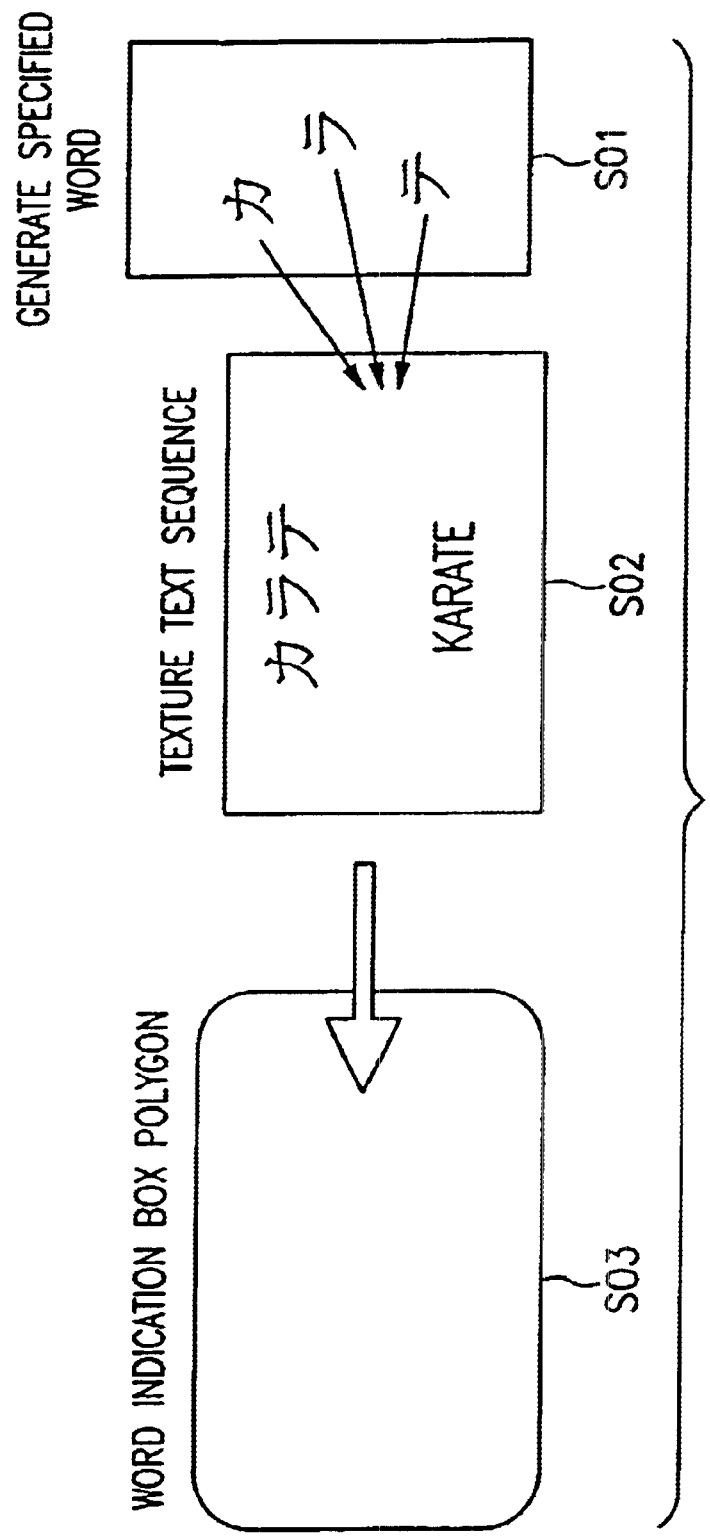
FIG. 4 is a diagram showing an example of attaching text character texture to a word indication box polygon on a polygon frame.

FIG. 4 shows an example wherein this text character texture is attached to the word indication box polygon of the polygon frame. In FIG. 4, for example, the text characters KA, RA, TE used in the specified word "KARATE" are generated, along with a character sequence {KARATE} indicating the alphabetical notation required to input the word "KARATE" (step S01).

Thereupon, a texture text sequence is generated according to this text character sequence (step S02). This texture text sequence is attached to the word indication box polygon (step S03).

Returning to FIG. 3, the polygons constituting the enemy stored previously in the graphics memory 9 and the word indication box polygon to which text character texture has been attached are combined into a synthesized image (step S7), which is further converted into two-dimensional co-ordinates data corresponding to the monitor display screen (step S8). This data is then written again to the graphics memory 9 (step S9).

Thereupon, the data is converted to an analogue video signal by the video DA converter 10, and displayed on a video monitor (not illustrated) (step S10).

Figure 5:
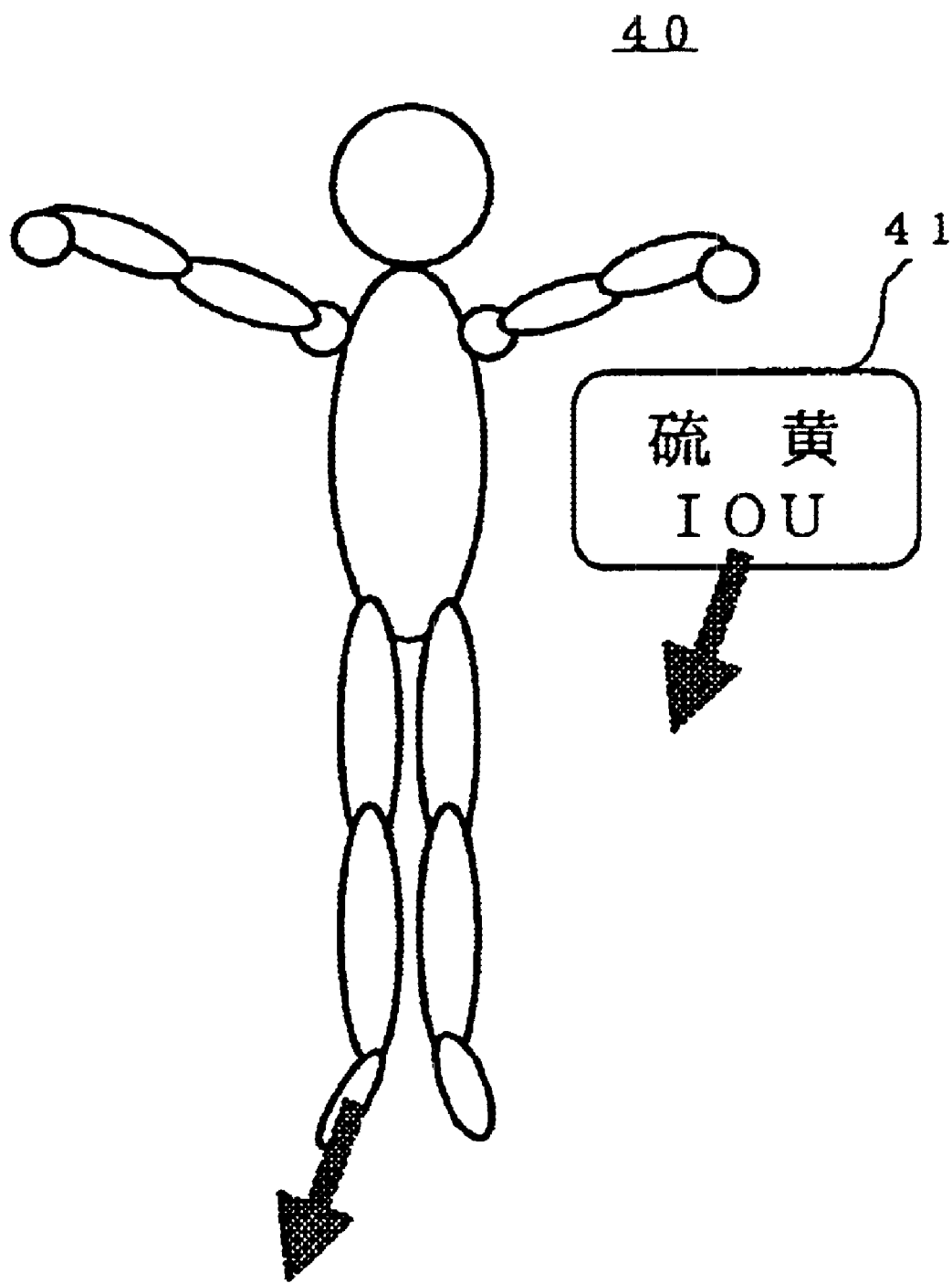
FIG. 5 is a diagram illustrating an example where polygons constituting an enemy and a word indication box polygon are synthesized into an image and displayed on a monitor.

FIG. 5 is a diagram showing an example where the polygons constituting an enemy and the word indication box polygon are image synthesized and then displayed on a monitor. In this diagram, the enemy 40 constituted by a plurality of polygons, and the word indication box polygon 41, are displayed in a prescribed positional relationship. This positional relationship is determined at step S7 in the flow diagram in FIG. 3, when image synthesis is performed.

The image position of the word indication box polygon 41 moves with the movement of the corresponding enemy 40, as indicated by the arrow in FIG. 5. In other words, the co-ordinates of the word indication box polygon 41 are updated in such a manner that it always follows the movement of the enemy 40.

Here, a case where the aforementioned enemy and word indication box are constituted by polygons is described as an embodiment. However, the present game device forming an image display device according to the present invention is not limited to a device which forms image display by means of polygons. In other words, it is possible to adopt a composition wherein enemies and word indication box images are generated as two-dimensional images, and are displayed on the display device. Moreover, it is also possible to create a synthesized display wherein the specified word image is superimposed over the two-dimensional image of the word indication box.

Figure 6:
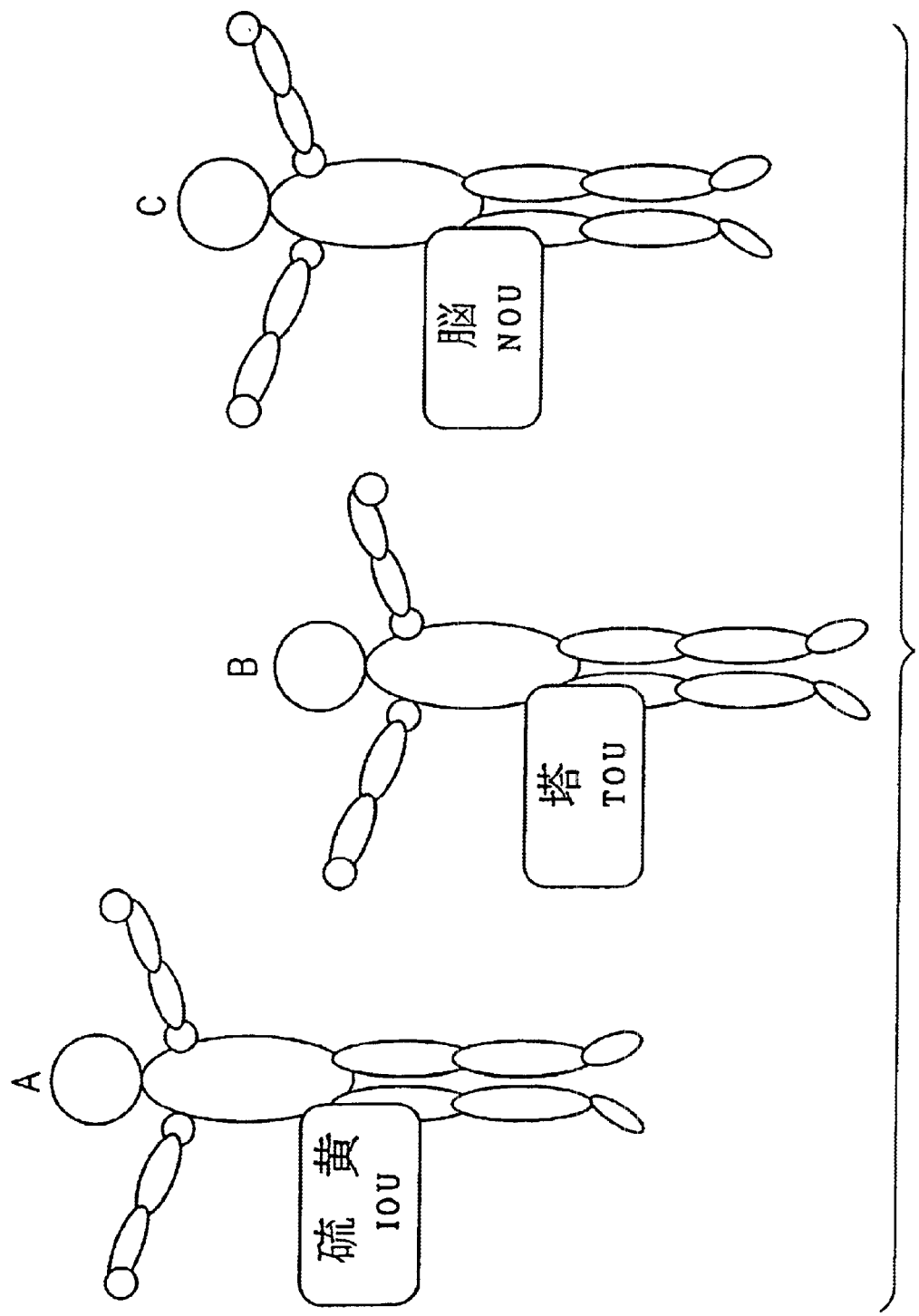
FIG. 6 is a diagram illustrating one example of a game device according to the present invention, wherein a plurality of enemies A, B, C are displayed on the same screen.

FIG. 6 illustrates the sequence of a typing game which is characteristic of the present invention, relating to one example of a game device according to the present invention, wherein a plurality of enemies A, B, C are displayed on a screen.

Word indication box polygons corresponding to the respective plurality of enemies A, B, C are displayed and text character texture is attached thereto. In FIG. 6, the words "IOU" ["Sulphur"], "TOU" ["Tower"] and "NOU" ["Brain"] are attached respectively to the corresponding word indication box polygons for enemy A, enemy B and enemy C.

If there are a plurality of enemies on the screen in this way, then when inputting typing via the keyboard in the game, the player must first establish which enemy he or she will input text for. In the description of the present invention, this is called "targeting".

In this case, if the player accurately predicts which of the enemies will advance first towards the player on the screen, and sets that enemy as a target, then the game will develop to his or her advantage. If, on the other hand, the player is attacked by a player that he or she has not targeted, then the player will lose points in the game.

In order to achieve effective targeting in the aforementioned manner, it is necessary to provide a restriction whereby two specified words starting with the same alphabetical character are not allowed on the screen at the same time. Details of this restriction are considered further in the generation of the text character sequences, as described hereinafter.

Figure 7:
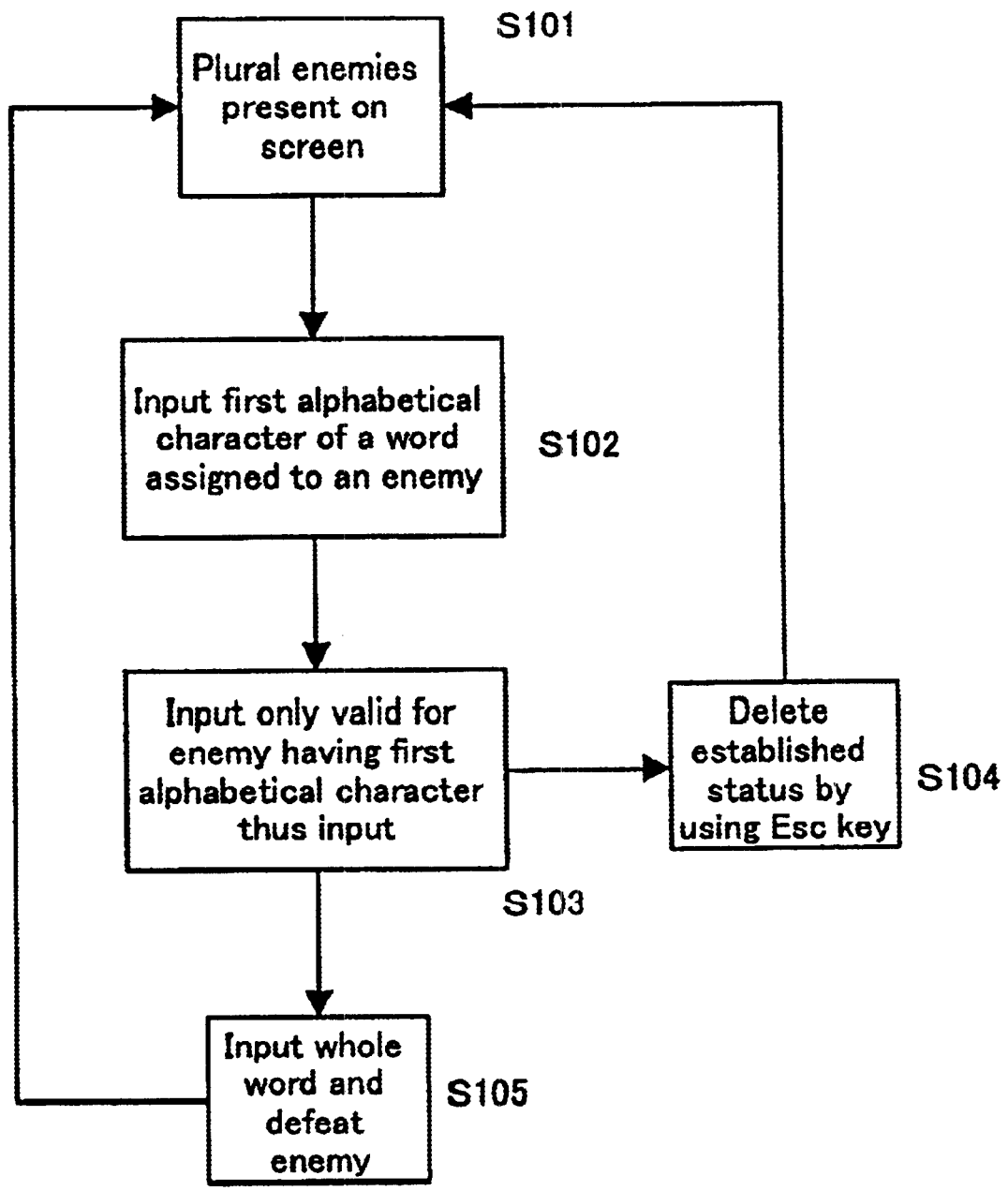
FIG. 7 is a flowchart describing typing input in a game, including targeting processing.

FIG. 7 is a flowchart describing typing input in a game comprising the aforementioned targeting processing.

In FIG. 7, if it is judged that there are a number of enemies present on the same screen (step S101), then the first alphabetical character (first character) assigned to any one of the enemies is input (step S102).

Thereupon, the CPU 20 searches for an enemy having a specified word matching the first character thus input, and if a match is found, then the corresponding enemy is targeted (step S103). Thereafter, only inputs corresponding to the character sequence for the specified word displayed in the word indication box polygon for the targeted enemy are accepted as valid.

Consequently, if all the characters of the specified word corresponding to the targeted enemy have been input correctly, then that enemy can be defeated (step S105).

At step S103, if a target is to be cancelled after having been set, then the escape key (Esc) key is pressed and the procedure returns to step S101 (step S104).

Providing further explanation with regard to FIG. 6, if the "T" key is input in a state where none of the enemies A, B, C are targeted, then the enemy B having the specified word "TOU" will be set as the target. Thereupon, by inputting the "O" key and the "U" key, enemy B can be defeated.

Thereupon, the targeted state is released and enemies A and C are in a non-targeted state.

If the "N" key is then input, enemy C having the specified word "NOU" will be targeted. By repeating the operation described above, all of the enemies on the screen can be defeated within a prescribed time.

In FIG. 6, it is also possible to adopt a mode whereby, if all of the enemies A, B, C remain in a non-targeted state for a prescribed period of time, then the specified words displayed in the word indication boxes corresponding to the respective enemies are updated. Thereby, the player can be encouraged positively to input a specified words.

Figure 8:
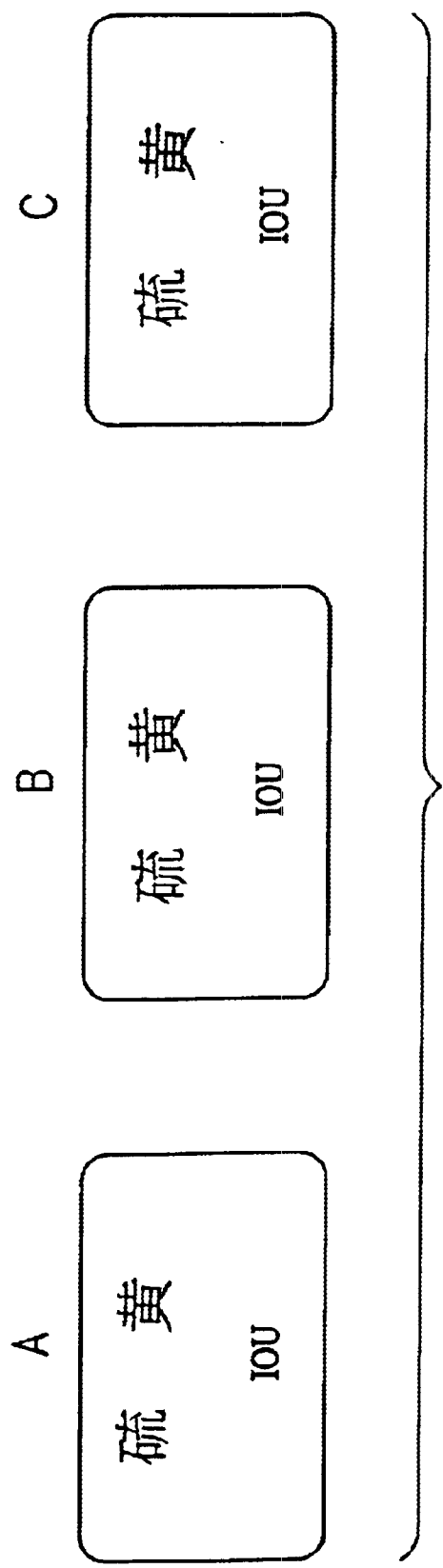
FIG. 8 is a diagram illustrating changes in the display of the texture shown in the word indication box polygon, in accordance with the typing input.

FIG. 8 is a diagram for describing changes in the display of the texture shown in the word indication box polygons, with respect to key inputs. In FIG. 8, if the specified word is "IOU", then when the "I" key is input, the character I disappears. When the "O" key is then input, the character 0 disappears. Moreover, when the "O" key is input, then the whole word IOU disappears, and the enemy A forming the target also disappears.

This control is performed by means of the CPU 20 executing and controlling the game program read into the system memory 5.

FIG. 9 is a diagram showing one example of changes in the display of an enemy corresponding to text character inputs corresponding to a specified word displayed in the word indication box polygon in FIG. 8 described above.

FIG. 9 illustrates the mutual relationships between the input phase, the state of the word specification box polygon, and the state of the enemy. The state of the enemy refers to representations of the enemy wherein, in phases 2 to 4, damage is applied to the corresponding enemy, each time a correct character is input.

Moreover, FIG. 9 illustrates two methods representing embodiments of methods for deleting the corresponding word indication box polygon, when all of the text characters in the specified word have been input correctly.

The first method is a method wherein the word is faded out, or where it is held in a flashing state for a short while, and then faded out.

The second method is a method wherein, if the last character input at phase 4 is correct, then the word indication box polygon is displayed as shattering into pieces.

Here, in FIG. 9, it is also possible to display an image wherein particular changes are made to the enemy, in cases where the player inputs a specified word which is not displayed in the word indication box. Thereby, the player is provided with the impression of having made an input error, and this can be expected to create a more positive effort and resolution in the player to continue playing the game.

Figure 10:
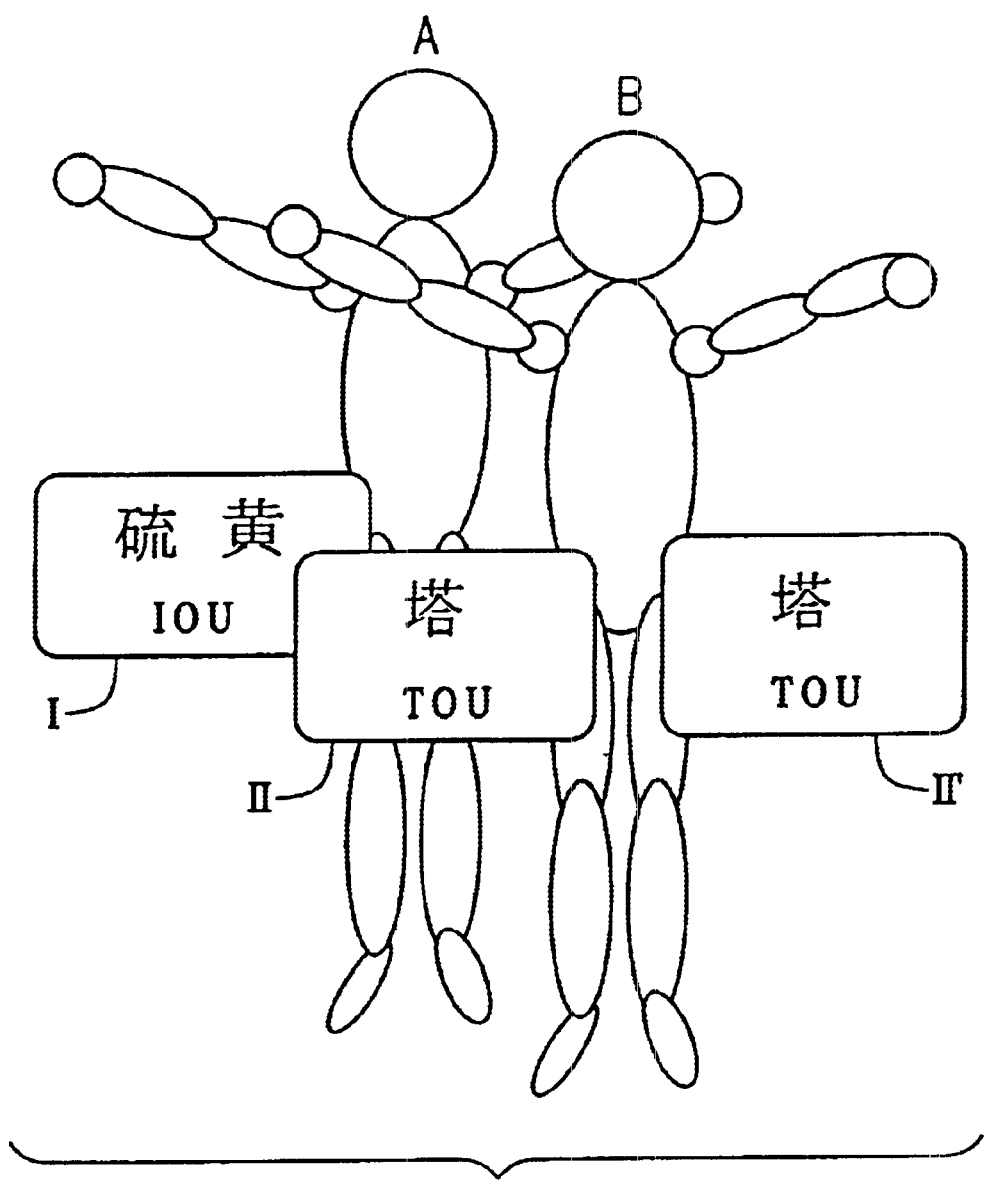
FIG. 10 is a diagram describing the relationship between the display positions of an enemy and a corresponding to word indication box polygon.

FIG. 10 is a diagram describing the relationship of the word indication box polygon with respect to the enemy. As described previously, at default setting, the display position co-ordinate s of the word indication box polygon have a prescribed positional relationship with respect to the enemy.

However, in cases where a plurality of enemy display positions approach, some consideration is required in setting the display positions of the word indication box polygons. FIG. 10 is a diagram illustrating a response to such as situation according to the present invention. In FIG. 10, enemies A and B are displayed as approaching. Here, the word indication box polygon I corresponding to enemy A and the word indication box polygon II corresponding to enemy B are displayed in an overlapping fashion.

In such a case, the display position of either one of the word indication box polygons is shifted. In the example in FIG. 10, display control is performed whereby the display position of the word indication box polygon II is shifted to create a word indication box polygon II'. This control can be performed by means of the CPU 20 detecting overlapping of the display co-ordinates of the word indication box polygons I, II, and then instructing the geometry processor 21 to shift the X-axis display co-ordinate of the word indication box polygon II.

Figure 11:
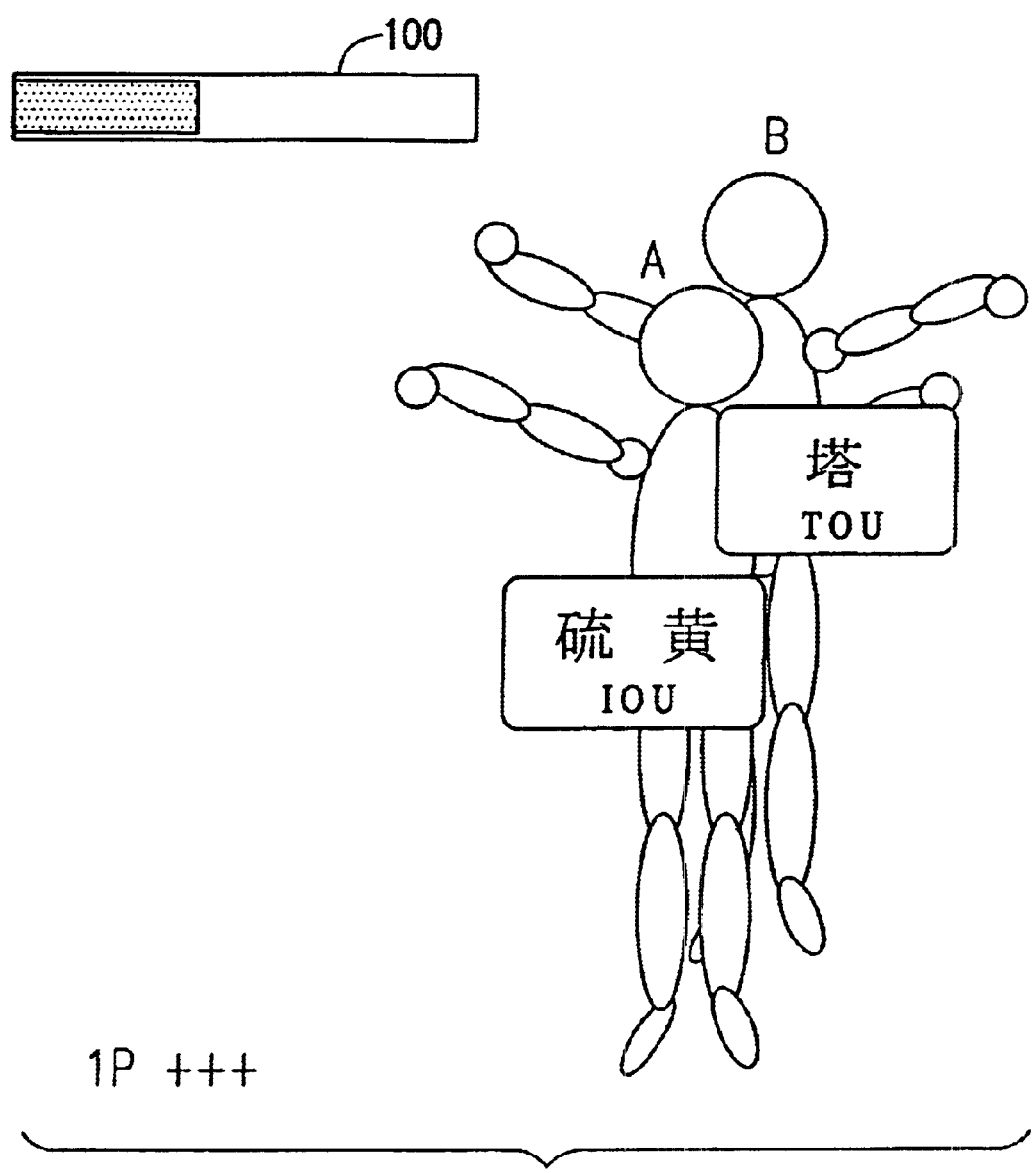
FIG. 11 is one example of a screen display indicating the display positions of word indication box polygons, in a case where a plurality of enemies are displayed in overlapping fashion.

FIG. 11 is one example of a screen display indicating the display positions of word indication box polygons in a case where a plurality of enemies are displayed in an overlapping fashion. As described above, the corresponding word indication box polygons are displayed as following the respective enemies, whilst maintaining a prescribed positional relationship therewith, but as illustrated in FIG. 11, if two enemies A, B are displayed in overlapping fashion, then the display positions of the word indication box polygons are controlled in such a manner that they are displayed in priority order, in other words, they are displayed in foremost positions on the screen.

This control is performed at step S8 in FIG. 3, by setting the magnitude of the Z axis co-ordinate to a maximum value, or to a specific value having higher priority than the polygons of the enemy characters, and then converting these co-ordinates to two-dimensional co-ordinates.

This control can be achieved by means of the rendering processor 3 performing sorting processing, in such a manner that the Z-axis co-ordinates of the word indication box polygons assume highest priority positions.

Therefore, in FIG. 11, the word indication box polygons showing the specified word "IOU" corresponding to enemy A and the specified word "TOU" corresponding to enemy B are displayed in foremost positions on the screen, regardless of the display priority of the enemies A and B.

In FIG. 11, the scale 100 indicated at the top left of the screen shows the player's attack skill level with respect to the enemies selected by the player. If the level display on this scale is reduced to zero, then the player will lose points. Conversely, if the level display is extended to a prescribed length, then the player can gain points.

The display "1P" shown in the bottom left of the screen indicates that the player is playing a one-player game. Furthermore, the + symbols shown on the right of the screen indicate the number of points. The number of points increases when the level display on the aforementioned scale 100 extends to a prescribed length, and the+ symbols increase accordingly. If the display of + symbols reaches zero, then the game terminates.

Moreover, in FIG. 11, in addition to the aforementioned scale 100 and + points symbols, it is also possible to display a time gauge or counter relating to an enemy approaching gradually on the screen (moving in such a manner that the player does not know when he or she will be attacked) which indicates when the enemy will reach the player or start an attack. Thereby, the player can readily and freely decide the enemy that is to be selected at the subsequent timing.

Next, the specified words displayed in the word indication box polygons described previously will be explained.

FIG. 12 is a table wherein a level of difficulty is indicated by a number for each one of the standard kana characters. This level of difficulty is determined by taking into account the number of times the character occurs in typing. In other words, lower numbers are assigned to characters which are frequently entered, and conversely, higher numbers are assigned to characters which are not frequently entered, when typing a standard text.

For example, the kana character "ha" is assigned a number 8, the kana character "ya" is assigned a number 9, and the kana character "shi" is assigned a number 9.

FIG. 13 is a diagram showing a portion of a specified word list. For example, the specified word "AI" is made up of the kana characters "a" and "i". Therefore, the level of difficulty for the specified word is the sum of the number 5 corresponding to "a" and the number 6 corresponding to "i", in the table in FIG. 12, namely, 11.

To give another example, the specified word "SHIRA-KUEN" is made up of six kana characters, and the level of difficulty for this word is 50, obtained from the sum of the numbers corresponding to each of the characters as indicated in FIG. 12.

The tables shown in FIG. 12 and FIG. 13 are incorporated as part of the game program. When polygon data constituting an enemy is sent to the rendering processor 3, the CPU 20 also transmits this table data to the rendering processor 3.

Therefore, when attaching texture to the polygons constituting the enemy, the rendering processor 3 determines one specified word at random from the group of specified words corresponding to a level of difficulty according to the development of the game, generates a character sequence texture, and attaches same to the word indication box polygon.

Here, the level of difficulty is updated in the following manner. Namely, after displaying a specified word or after input corresponding to the specified word has started, the time until completion of that input (number of frames in the game) is measured.

Any subsequent increase or decrease in the level of difficulty of the specified word or in the input limit time, or the like, is determined on the basis of the time period until the aforementioned input was completed. Therefore, a specified word is selected at random from a group corresponding to the determined level of difficulty. In this manner, it is possible to display specified words which correspond to the typing skill of the player.

Figure 14:
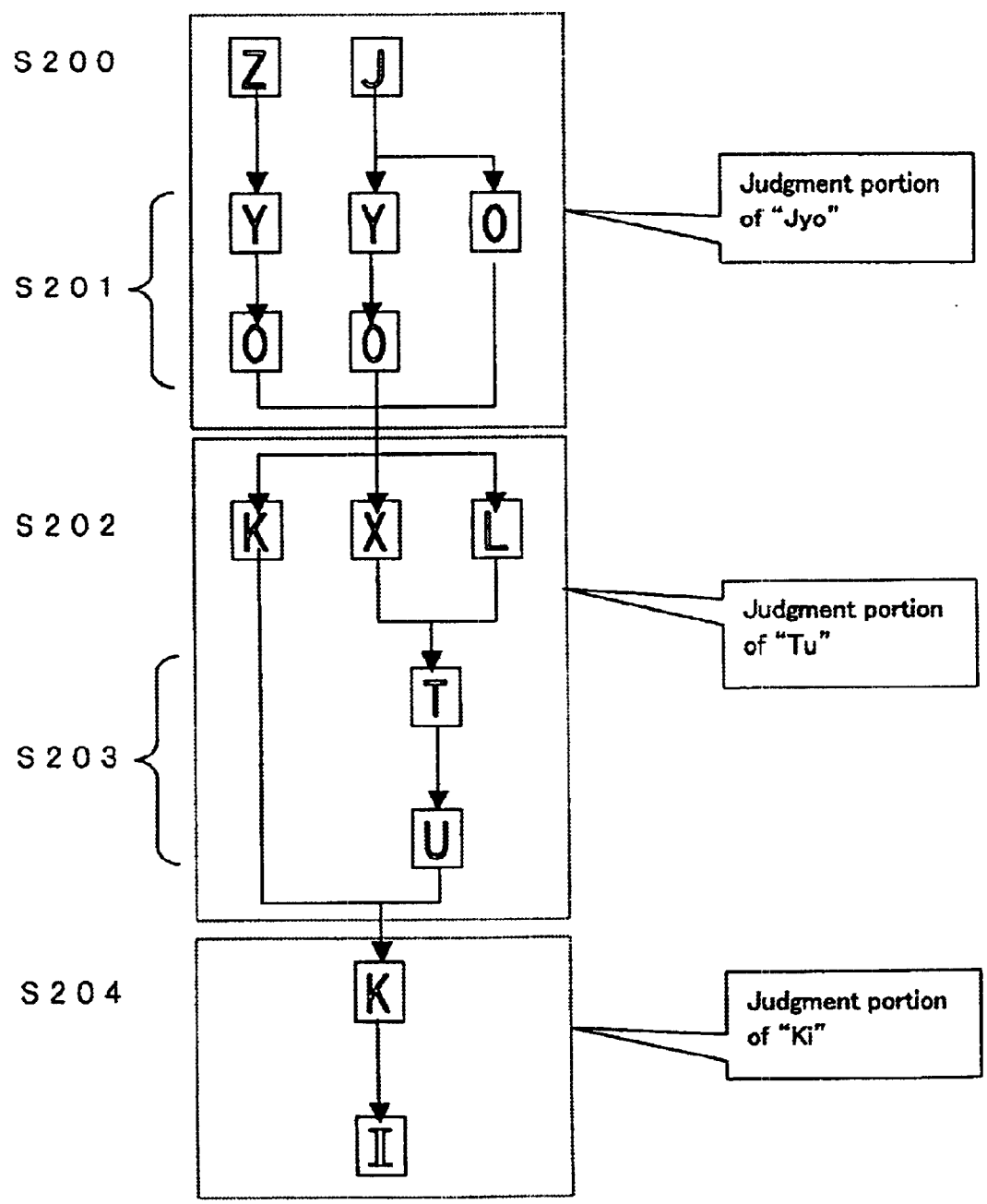
FIG. 14 is a diagram illustrating fuzzy input corresponding to a specified word, this being one characteristic feature of the present invention.

FIG. 14 is a diagram for illustrating 'fuzzy' input corresponding to a specified word, which is one characteristic of the present invention. When inputting Japanese by means of alphabetical characters, a method is used whereby it is examined whether the input method corresponds to a generally recognized input method (roma-ji, Hepburn method, or the like), and it is determined whether or not the input correctly matches the Japanese displayed as a specified word.

By updating the table shown in FIG. 13 above in the memory, in real time, with the alphabetical input characteristics of the player, then it is possible to reflect these characteristics in the alphabetical display when the next specified word is displayed.

An example is described below. For instance, let it be supposed that the specified word is "JYOKKI".

The alphabetical notations which may be considered to be correct for "JYOKKI" are as follows:

JOKKI
JYOKKI
ZYOKKI
JOXTUKI
JYOXTUKI
ZYOXTUKI
JOLTUKI
JYOLTUKI
ZYOLTUKI

In FIG. 14, since the first kana character for JYOKKI is "ji" if an alphabetical character other than "Z" or "J" is input, then the input is judged to be incorrect (step S200).

Next, as the input corresponding to "yo", if "yo" is input in the case of "Z", or if "either "yo" or "o" is input in the case of "J" then the input is considered to be correct, whereas any inputs other than these are considered to be incorrect (step S201).

Thereupon, as the input corresponding to "tsu", then after inputting JYO, JO, or ZYO, for "JYO", it is acceptable to input the next sound (in this case, "K") or to input either L or X (step S202).

If "L" or "X" is input after "JYO", "ZYO" or "JO", then the next character to be displayed will be "TU", and any input other than "T" will be considered to be incorrect (step S203).

Moreover, if "K" is input after "JYO", "ZYO" or "JO", then the input will be not taken as correct unless the input of K is subsequently repeated (step S204).

These decisions are made by the CPU 20, which monitors whether the input text is correct or incorrect.

Figure 15:
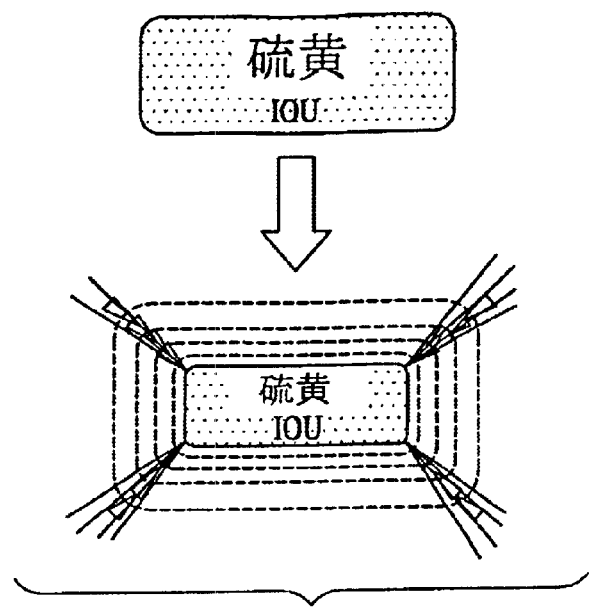
FIG. 15 illustrates one method for indicating to the player which enemy of the plurality of enemies has been selected as an attack object, in the targeting process illustrated in FIG. 6.

FIG. 15 shows one method for indicating to the player the enemy selected as an attack object from a plurality of enemies in the targeting operation described in FIG. 6. In this example, the surround of the word indication box polygon is changed in the display.

Figure 16:
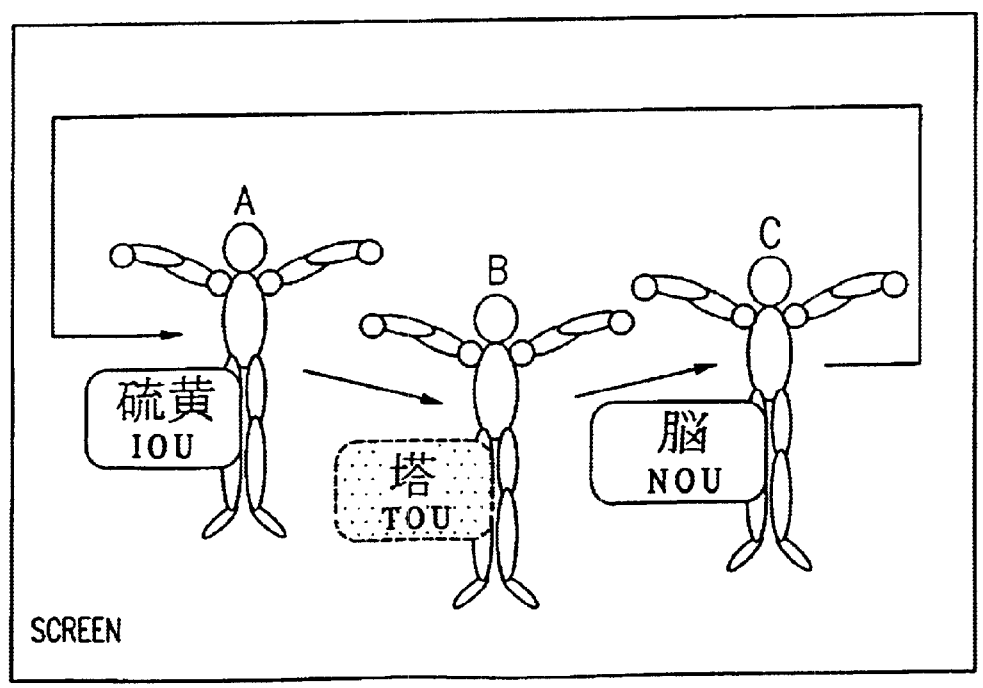
FIG. 16 is a diagram illustrating a further method for cancelling an already targeted enemy and targeting another enemy.

FIG. 16 is a diagram illustrating a further method wherein an enemy that has been targeted is cancelled and another enemy is targeted. In the method described previously, targeting is cancelled by pressing the escape key (Esc).

On the other hand, the method in FIG. 16 is a method wherein the targeted enemy is shifted progressively by pressing the tab key. The player is able to re-set the target to a desired enemy position by repeatedly pressing the tab key.

Here, referring once again to FIG. 6, the respective enemies A, B, C are not necessarily restricted to the same positions in the line of sight of the player, throughout the development of the game.

Figure 17:
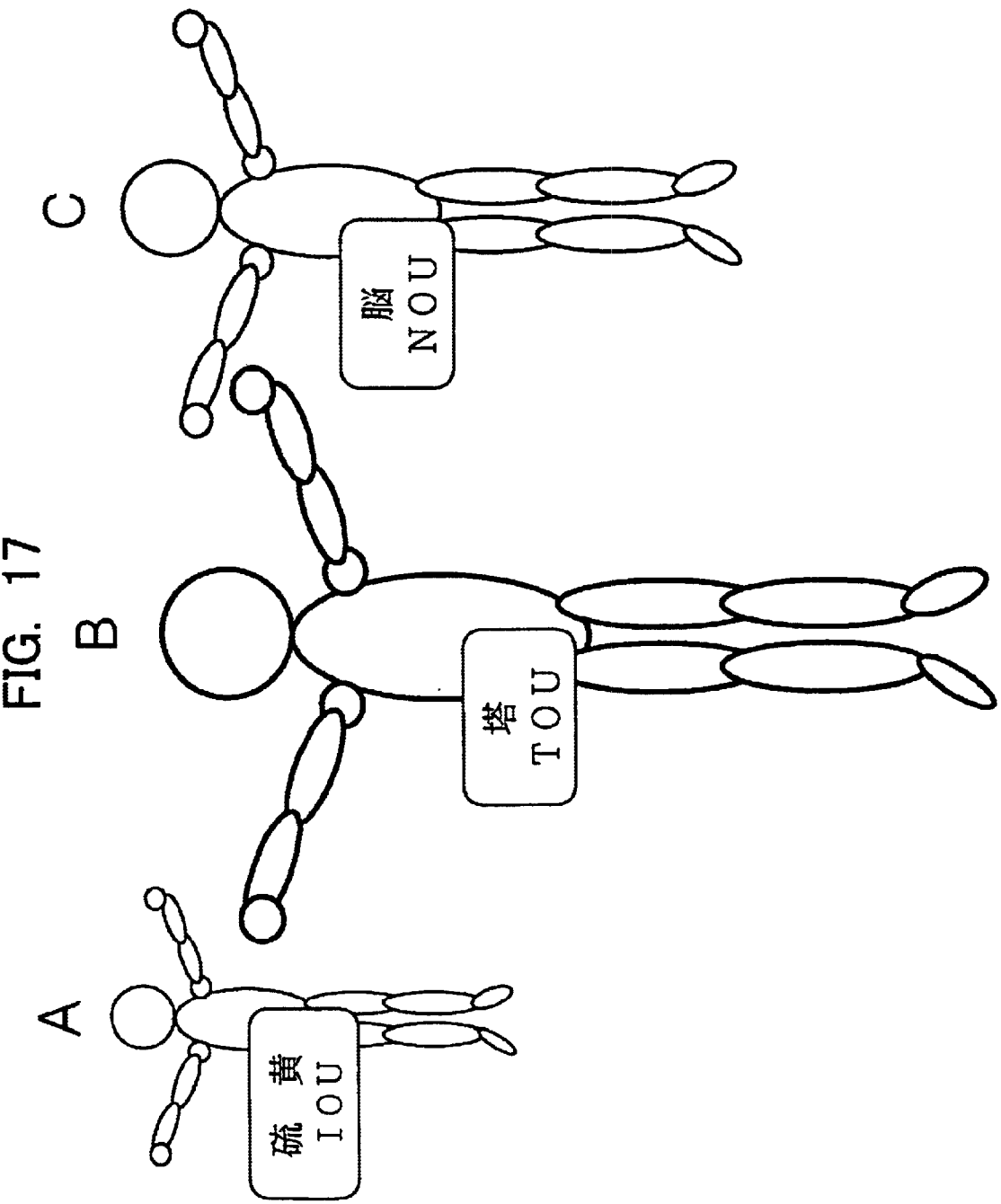
FIG. 17 is a diagram showing a display screen illustrating one embodiment of the present invention, for the purpose of comparison with FIG. 6.

FIG. 17 is a diagram showing a display screen illustrating one embodiment of the present invention, for comparison with that in FIG. 6. The enemies A, B, C are respectively located in different positions in the line of sight of the player. Therefore, they are displayed as having different sizes.

However, the word indication box polygons displayed corresponding to each enemy have the same size. This is in order to resolve situations where the specified words may become difficult for the player to distinguish if the size of the word indication box polygon is changed according to the size of the enemy.

In the embodiment in FIG. 17, the display size of the word indication box polygon is the same, regardless of the size of the enemy displayed. Thereby, the aforementioned problem is resolved.

In order to achieve this display, at step S4 in the flowchart shown in FIG. 3, the word indication box polygons generated to correspond with the enemies have three-dimensional co-ordinates, as stated previously. Therefore, the size of the word indication box polygons displayed can be set to a uniform size, by setting the Z-axis direction value of the word indication box polygons to a fixed specific value, when synthesizing the polygons constituting the enemies, at step S7.

Figure 18:
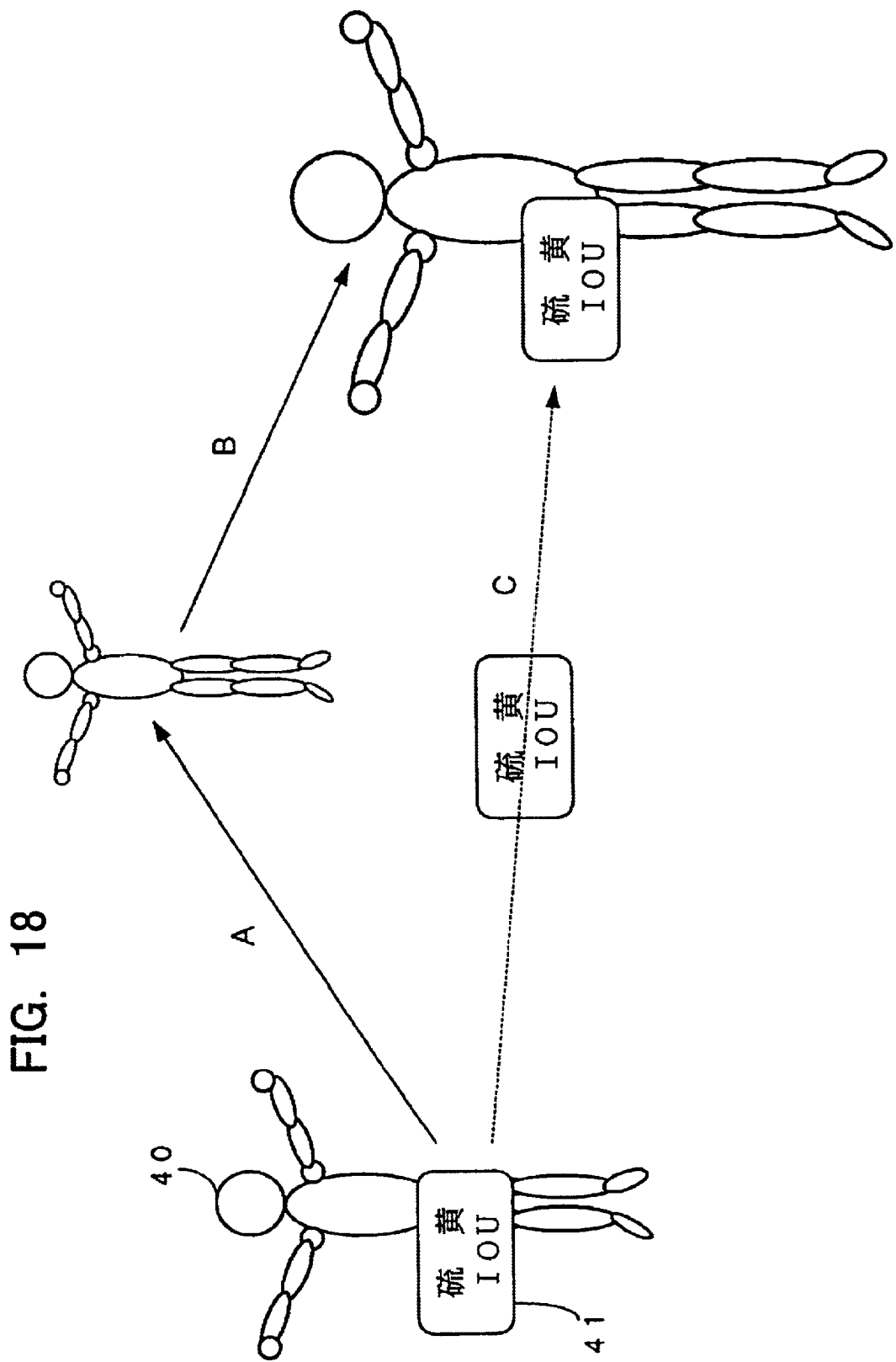
FIG. 18 is a diagram illustrating the relationship between movement of an enemy and movement of a word indication box polygon, representing a further embodiment of the present invention.

FIG. 18 is a diagram illustrating the relationship between the movement of the enemies and the movement of the word indication box polygons, representing a further embodiment of the present invention.

In FIG. 5, it was illustrated that the word indication box polygon 41 is moved in such a manner that it follows the movement of the enemy 40. A case is now considered wherein the enemy 40 moves as illustrated in FIG. 18.

Namely, in FIG. 18, it is supposed that the enemy 40 moves along travel paths A and B. Here, if the word indication box polygon corresponding to the relevant enemy is also displayed as passing along the travel paths A and B, then it will not necessarily be easy for the player to type the corresponding input.

Therefore, in this embodiment of the present invention, the word indication box polygon 41 is displayed as moving along a bypass path of travel C, which links the movement start position and movement end position of travel paths A and B.

Figure 19:
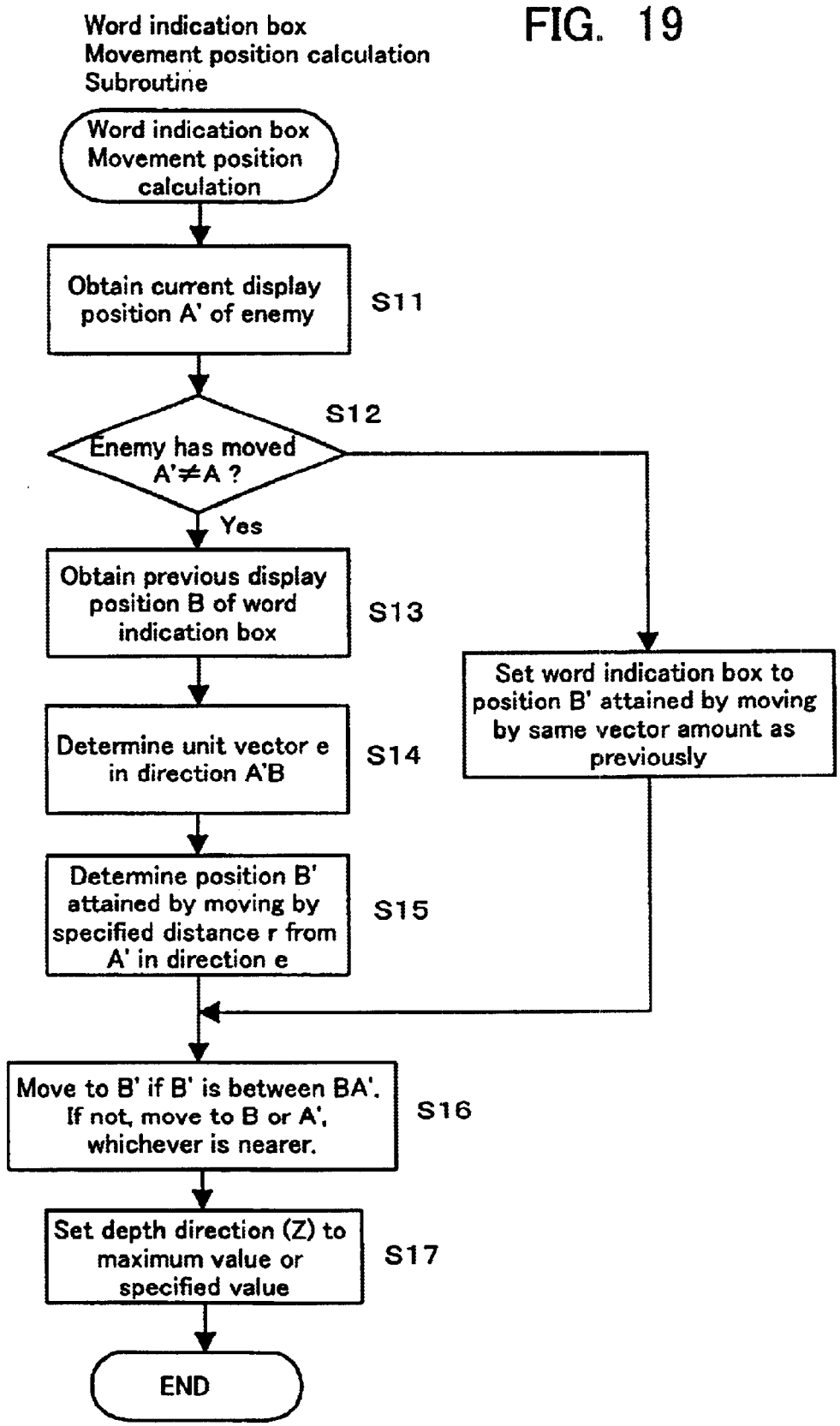
FIG. 19 is a diagram showing a subroutine for calculating the movement position of a word indication box polygon, for achieving the embodiment in FIG. 18.

FIG. 19 is a diagram showing a word indication box polygon movement position calculation subroutine, for realizing the embodiment shown in FIG. 18, this being a subroutine executed at step S4 in the flowchart in FIG. 3.

Figure 20:
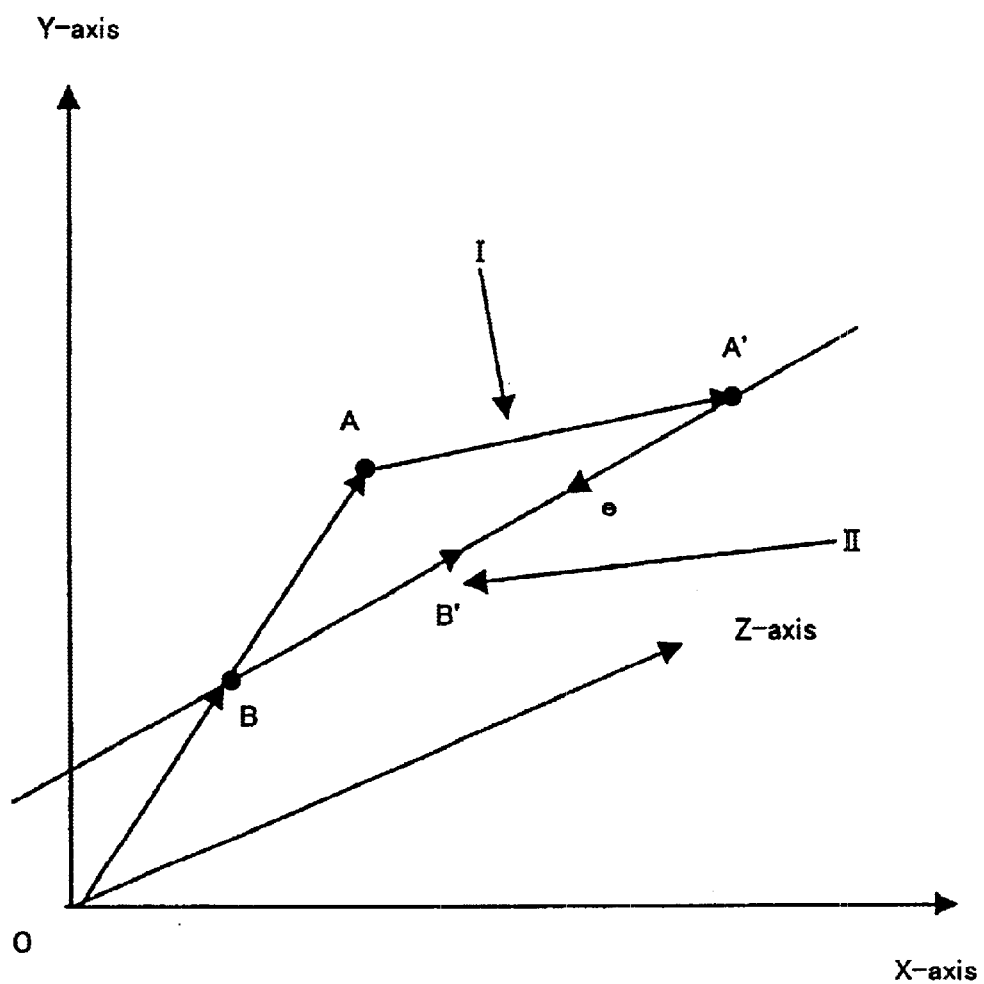
FIG. 20 is a conceptual diagram for describing the subroutine in FIG. 19.

FIG. 20 is a general diagram for illustrating the subroutine in FIG. 19. Below, the operation in FIG. 19 is described whilst referring to FIG. 20. In FIG. 20, travel path I is the movement path of the enemy 40, and travel path II is the movement path of the word indication box polygon 41.

In FIG. 19, the current display position A' of the enemy is obtained (step S11). Thereupon, the current display position A' is compared with the previous display position A (step S12), and if A'≠A, then it is judged that the enemy has moved.

If A'≠A and it is judged that the enemy has moved, then firstly, the previous display position B of the word indication box polygon is determined (step S13). Thereupon, the direction is determined from the unit vector e of A'B (step S14).

Next, the position B' achieved by moving a set distance r in direction e, from A', is determined (step S15). The position is moved by a distance r in order to control the display such that the word indication box polygon follows the enemy A with a delay of r.

Thereupon, if the position is between BA', then it is moved to B'. Otherwise, the determined position B' is moved to either B or A', whichever is the nearer (step S16).

Thereupon, the depth direction (Z value) is set to a maximum value or specific value (step S17). Here, by setting it to a maximum value, the word indication box polygon 41 will always have a Z value which gives it higher display priority over the polygons constituting the enemy 40, and hence the word indication box polygon 41 will always be displayed without being obscured by the enemy 40.

Moreover, if setting the depth value to a specific value, then it should be set within a range which will not be exceeded by the display priority of the enemy 40 polygons.

Figure 21:
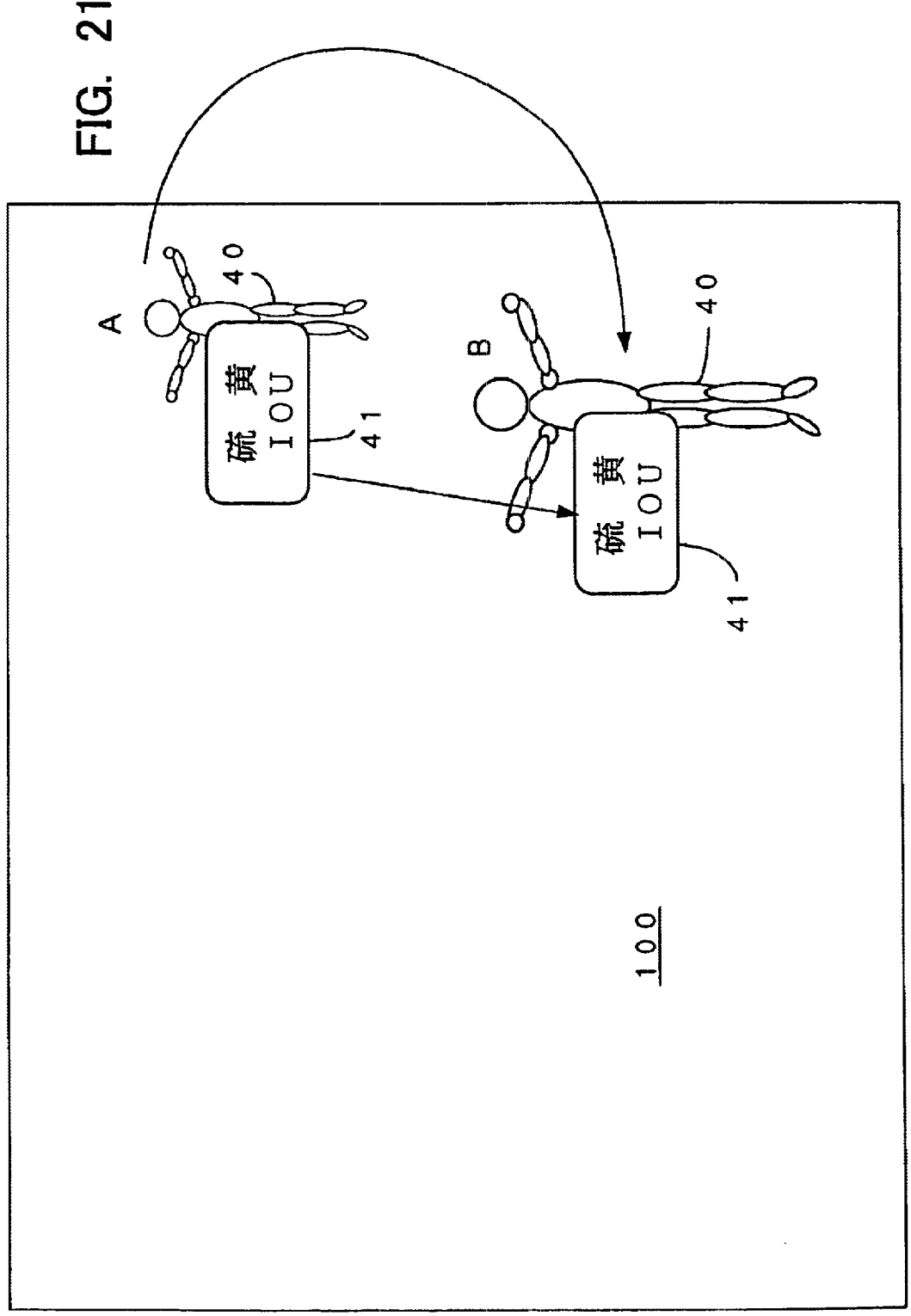
FIG. 21 is a diagram illustrating a case where an enemy 40 situated in a display position on the monitor screen 100 moves beyond one edge of the monitor screen and is re-displayed at display position B.

Next, a case is considered where part of the enemy 40 moves beyond one edge of the monitor screen, and it is therefore re-displayed. FIG. 21 is a diagram illustrating a case where an enemy 40 located in a display position on the monitor screen 100 moves beyond one edge of the monitor screen, and is re-displayed in a display position B.

According to the principle that the word indication box polygon 41 follows the movement of the enemy 40, when the enemy 40 moves beyond the edge of the monitor screen, the word indication box polygon 41 also moves off the monitor screen.

In this case, the player may lose sight of the specified word that that he or she is meant to input, due to the display of the word indication box polygon 41 disappearing off the screen. Therefore, as shown in FIG. 21, in this embodiment, it is devised that the word indication box polygon 41 can always be displayed, even in cases where the corresponding enemy 41 disappears from the screen.

Figure 22:
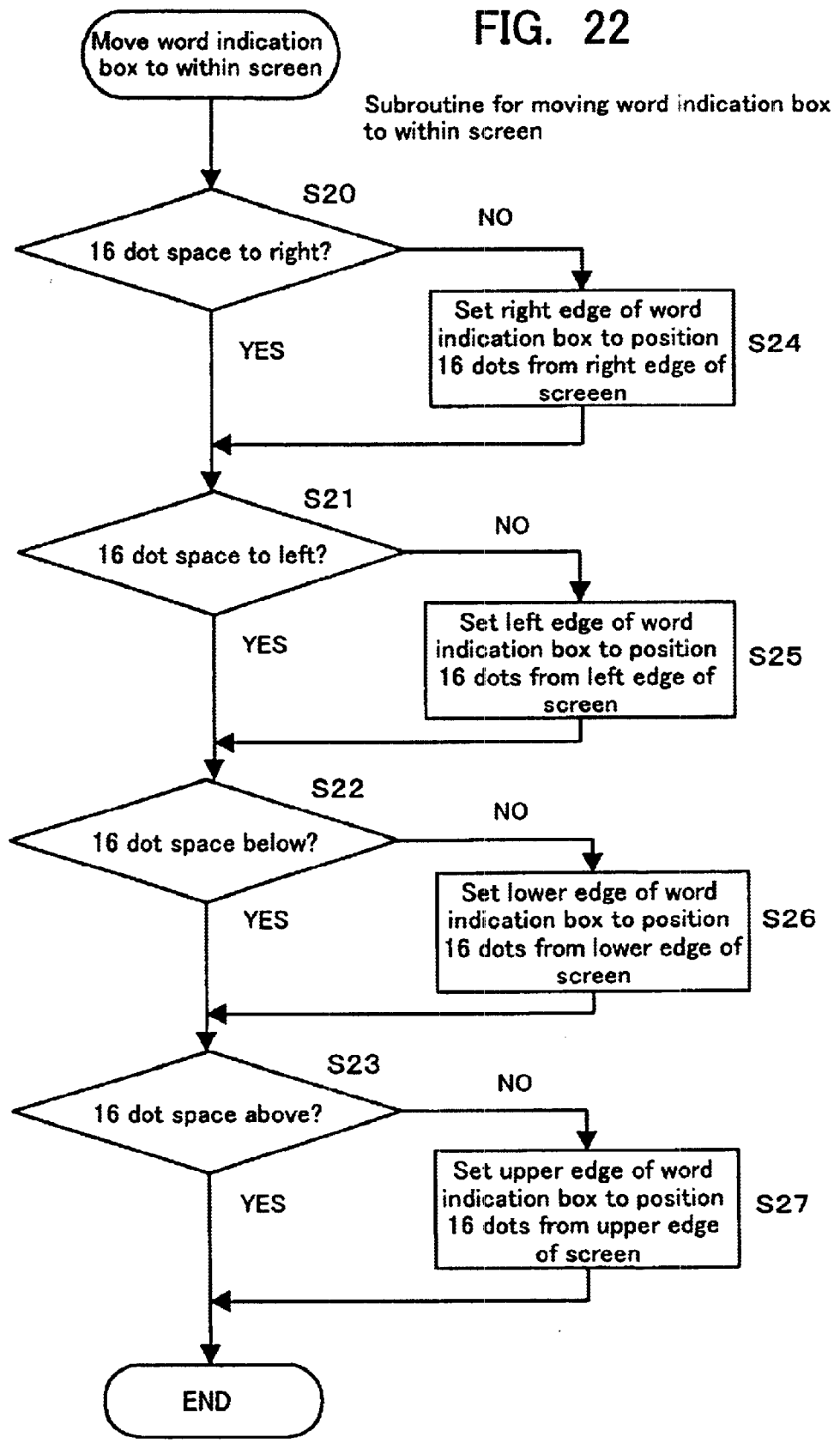
FIG. 22 is a control flow diagram of an embodiment which enables a word indication box polygon 41 to be displayed at all times, even if the display of the corresponding enemy 41 disappears.

A control sequence for achieving this is depicted in FIG. 22. Specifically, in this embodiment, when the word indication box polygon 41 is displayed on the monitor screen 100, it is judged whether or not 16 dots exist to the right-hand side, left-hand side, lower side and upper side of the word indication box polygon 41 (steps S20, 21, 22, 23).

If the corresponding 16-dot space does not exist respectively to the right-hand side, light-hand side, lower side and upper side, then the display position of the word indication box polygon is shifted, to the right, left, downwards or upwards, in such a manner that a 16-dot space is created (steps S24, 25, 26, 27).

By performing this control, it is possible to display the word indication box polygon 41 on the monitor screen at all times, even if the enemy 40 moves off the monitor screen display, and hence there is no impediment to the typing input of the player.

Moreover, here, it is necessary to return to the cases illustrated in FIG. 6 or FIG. 17, to consider the conditions under which an enemy displayed on the monitor screen will be deleted from the screen.

Figure 23:
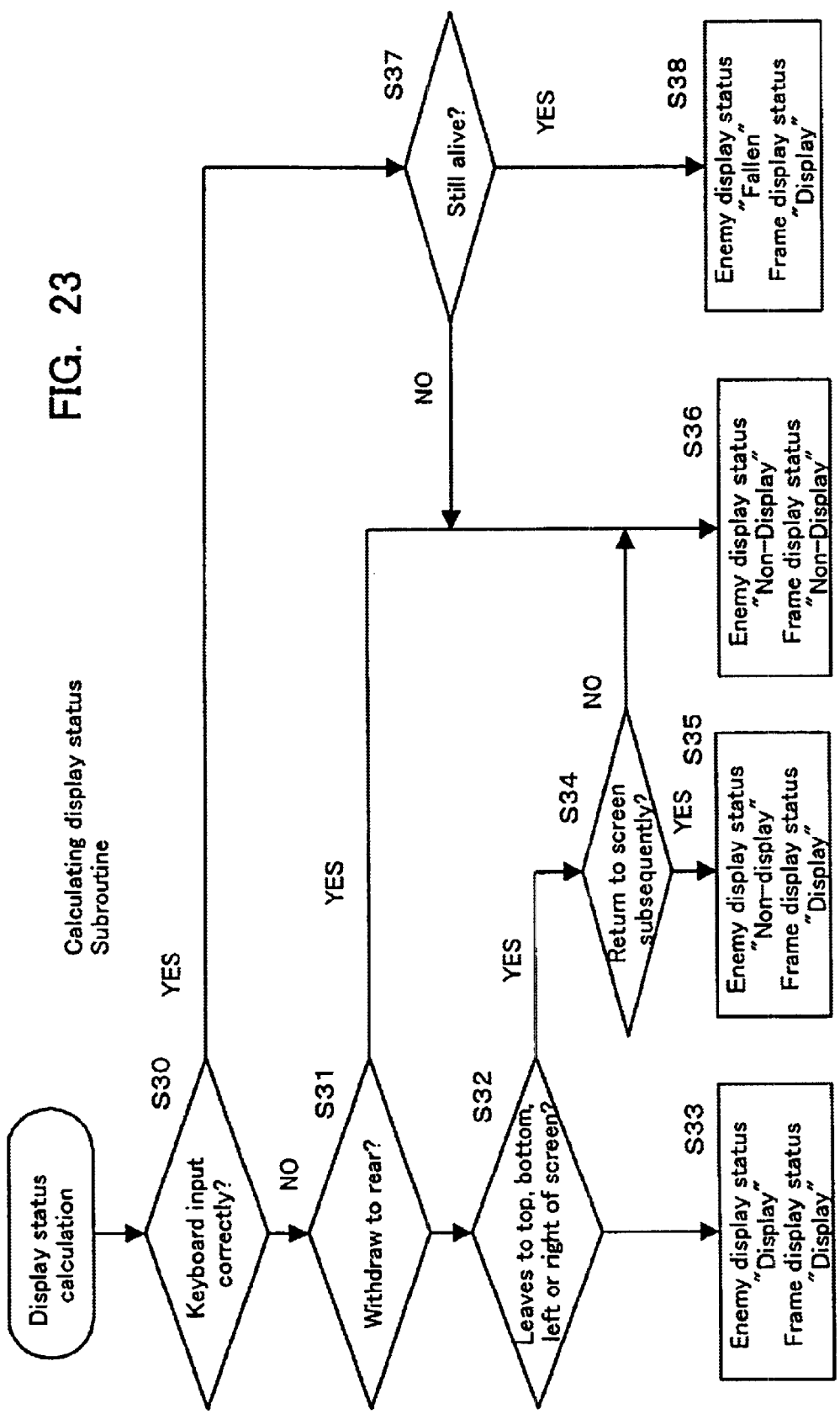
FIG. 23 is a flow diagram of an embodiment, illustrating a method for causing an enemy displayed on the monitor screen to disappear.

FIG. 23 is a flow diagram of an embodiment of the present invention, illustrating a method for deleting an enemy displayed on the monitor screen.

Firstly, it is determined, for each respective enemy, whether or not a correct input has been made for the word in the corresponding word indication box polygon (step S30).

Here, it is supposed that unless a correct keyboard entry is made, the enemy in question will not be selected. If an unselected enemy moves towards the rear (step S31 YES), then the enemy display status is set to "non-display", and at the same time, the frame display status for the corresponding word indication box polygon is also set to "non-display". Thereby, an enemy that is not selected will retreat from the monitor screen and be deleted (step S36).

If an enemy that is not selected at step S31 does not move towards the rear of the screen, but rather disappears by moving in the upward, downward, leftward or rightward directions on the screen (step S32: YES), then it is subsequently determined whether or not to perform control to return the enemy to the monitor screen again (step S34). If it is to be returned to the monitor screen (step S34 YES), then the enemy display status is set to "non-display", and the frame display status is set to "display" (step S35).

The control of the display of the word indication box polygons in this state is as illustrated in FIG. 21 and FIG. 22.

Moreover, if at step S34, control to return the enemy to the monitor screen is not to be performed (step S34 NO), then the enemy display status and the frame display status are set to "non-display", and the enemy disappears (step S36).

If an enemy that is not selected at step S30 does not moves rearwards and does not move in any of the upward, downward, leftward or rightward directions on the screen, then both the enemy display status and the frame display status are set to "display" (step S33).

In FIG. 23, if an enemy is selected at step S30 (step S30: YES), then if that enemy is still alive, the enemy display status is set to "fallen", the frame display status is set to "display", and the enemy becomes the object of an attack by the player (step S38).

If the enemy has died at step S37, (step S37: NO), then both the enemy display status and the frame display status are set to "non-display", and the enemy disappears (step S33).

Here, in the foregoing description, the game device comprised the functional block illustrated in FIG. 2, but the application of the present invention is not limited to this. The characteristic features of the present invention may also be realized by means of a generic information processing device having CPU and rendering functions.

Moreover, in addition to the embodiments described above, the present invention may also be implemented in the following modes.

In FIG. 6, it was described that a player can make an input by selecting a specified word displayed in a word indication box in correspondence with an enemy, but it is also possible to prohibit reception of key inputs under prescribed conditions. For example, key input can be prohibited in cases where the enemy is depicted in a defensive position, for example, hiding its face with its hands, or the like.

Therefore, the key input must be performed in a short period of time before the display of the enemy changes to a state where key input is prohibited. This promotes the development of the game.

Furthermore, in FIG. 1 above, mention was made of implementation of a two-player game, and in one mode thereof, key input can be made by either player. In other words, in such a mode, two players co-operate together to defeat a plurality of enemies displayed on the screen.

On the other hand, it is also possible to compose a competitive game involving two players. In this case, a desired word is entered, in a remaining time period or a remaining number of opportunities set for each player in the game. Control is performed whereby desired word information input by one player is reflected in the specified word that the opposing player has to input.

In other words, as the competitive game progresses, remaining time and remaining opportunities for the player are generated, whilst the player completes key input corresponding to a word that he or she has to input, until the next word to be input is displayed in the word indication box.

In this remaining time and remaining opportunities, the player inputs a word which he or she supposes the opposing player will find difficult to input. This input word is then displayed in a word indication box corresponding to an enemy that must be attacked by the opposing player. Thereby, a player capable of inputting words such that he or she obtains the longest possible remaining time and remaining opportunities is able to play a competitive game in an advantageous manner.

INDUSTRIAL APPLICABILITY

The present invention provides a game device for executing a game involving competition of typing skills, which provides enhanced game characteristics, wherein specified words that are to be input are not fixed in relation to game characters, in other words, displayed enemies.

What is claimed is:

1. A game device for displaying objects and specified words attached to the objects on a display screen, and for controlling a game to progress according to an input speed and accuracy of typing by a player for the specified words, in accordance with execution and controlling of a program, the game device comprising:

control means for executing the program;

geometry calculating means for performing co-ordinate conversions of a plurality of polygons constituting an object; and rendering processing means for converting three-dimensional co-ordinates of the plurality of polygons constituting said object, as generated by said geometry calculating means, to two-dimensional co-ordinates and generating a display image of the object, wherein the geometry calculating means generates an operation instruction display region polygon, which corresponds to said object, has a display priority higher than that of polygons constituting the object and is controlled to move with a predetermined relation to the movement of displayed coordinate positions of the object according to the program executed and controlled by said control means, and wherein the rendering processing means generates a display image for displaying the operation instruction display region polygon together with the object according to the display priority of the generated operation instruction display region polygon, and displays a specified word prompting a player to input typing of the specified word on said operation instruction display region polygon.

2. The game device according to claim 1, wherein if display positions of a plurality of objects are overlapping, then the display priorities in the depth direction of the plurality of operation instruction display region polygons corresponding respectively to said plurality of objects are set higher than the display priorities in the depth direction of said plurality of objects, according to the program executed and controlled by said control means, and the display positions of said plurality of operation instruction display region polygons are controlled in such a manner that they do not overlap mutually beyond a prescribed amount.

3. The game device according to claim 1, wherein when said operation instruction display region polygon is controlled to move with the predetermined relation to the movement of displayed coordinate positions of the object, then in cases where the corresponding object moves in a non-linear fashion, a corresponding operation instruction display region polygon is controlled in such a manner that it moves along a linear path of travel linking a movement start position and a movement end position of said object.

4. The game device according to claim 1, wherein alphabetical characters indicating reading of specified words displayed in said operation instruction display region polygons are appended thereto, said control means determines a match thereof with alphabetical characters input by a player, and if said match meets prescribed conditions, then prescribed changes are applied to a display of the object corresponding to said operation instruction display region polygon, according to the program executed and controlled by said control means.

5. The game device according to claim 4, wherein said prescribed conditions are cases where the typing input is correct for an individual specified word, or for each character of the alphabetical characters indicating the reading of said specified word.

6. A game device for controlling a game to progress according to an input speed and accuracy of typing by a player for specified words, the game device comprising:

control means for executing a program; and display means for displaying a plurality of objects and specified words attached to each of the plurality of objects to promote a player to input typing of the specified words, wherein said control means performs control in such a manner that, when the player input a first alphabetical character of the alphabetical characters indicating the reading of any one of the specified words attached to each of the plurality of objects, the object to which a specified word corresponding to the input first character is identified as an attack object, and subsequent typing input is considered as valid only with respect to the specified word of the operation instruction display region polygon corresponding to said identified object.

7. A game device for controlling a game to progress according to an input speed and accuracy of typing by a player for specified words, the game device comprising:

control means for executing a program; and display means for displaying a specified word to promote a player to input typing of the specified word, wherein the displayed, specified word is attached with alphabetical characters indicating the reading of the specified word, and if alphabetical characters input by the user correspond any one of different combinations of alphabetical characters indicating the reading of the specified word, the input made polygon is controlled in such a manner that it moves along a linear path of travel linking a movement start position and a movement end position of said object.

8. The game device according to claim 7, wherein a table of difficulty level numbers corresponding to kana characters is provided, and the difficulty level of said specified word is taken as a number given by summing the difficulty level numbers corresponding to the respective kana characters which form the reading of the specified word, according to the program executed and controlled by said control means.

9. The game device according to claim 8, wherein in development of the game, if the typing input made by the player with respect to a specified word having a reading of a first difficulty level number is correct, then the specified word displayed subsequently is selected at random from a group of specified words having a difficulty level number that is not smaller than said first difficulty level number.

10. A storage medium storing a program to be executed in a game device for controlling a game to progress according to an input speed and accuracy of typing by a player for specified words, wherein in accordance with the execution of the program, control means controls in such a manner that an operation instruction display region polygon corresponding to an object is generated;

a specified word prompting the player to input typing of the specified word is displayed on the operation instruction display region polygon;

said operation instruction display region polygon is set to have a display priority higher than that of polygons constituting the object, and is controlled to move with a predetermined relation to movement of displayed coordinate positions of the object according to the program executed and controlled by said control means;

a displaying image is generated for displaying the operation instruction display region polygon together with the object according to the display priority of the generated operation instruction display region polygon; and a specified word prompting a player to input typing of the specified word is displayed on the operation instruction display region polygon.

11. The storage medium storing a program according to claim 10, wherein the program is executed and controlled by said control means performs control in such a manner that, if display positions of a plurality of objects are overlapping then the display priorities in the depth direction of the plurality of operation instruction display region polygons corresponding respectively to said plurality of objects are set higher than the display priorities in the depth direction of said plurality of objects, and the display positions of said plurality of operation instruction display region polygons are controlled in such a manner that they do not overlap mutually beyond a prescribed amount.

12. The storage medium storing a program according to claim 10, wherein the program is executed to control in such a manner that when said operation instruction display region polygon is controlled to move with the predetermined relation to the movement of displayed coordinate positions of the object, then in cases where the corresponding object moves in a non-linear fashion, a corresponding operation instruction display region polygon is controlled in such a manner that it moves along a linear path of travel linking a movement start position and a movement end position of said object.

13. The storage medium storing a program according to claim 10, wherein alphabetical characters indicating reading of specified words displayed in said operation instruction display region polygons are appended thereto, said control means determines a match thereof with the alphabetical characters input by a player, and if said match meets prescribed conditions, then the program executed and controlled by said control means applies prescribed changes to display of the object corresponding to said operation instruction display region polygon.

14. A storage medium storing a program to be executed by control means in a game device in which a game progresses according to an input speed and accuracy of typing by a player for specified words, wherein a plurality of objects and specified words attached to corresponding one of the plurality of objects are displayed in accordance with the execution of the program by the control means, and wherein when a first alphabetical character of the alphabetical characters indicating the reading of a displayed, specified word, an object to which the displayed, specified word is attached is identified as an attack object, and subsequent typing input is considered as valid only with respect to the specified word of the operation instruction display region polygon corresponding to said identified object.

15. The storage medium storing a program according to claim 13, wherein said prescribed conditions are cases where the typing input is correct for an individual specified word, or for each character of the alphabetical characters indicating the reading of said specified word.

16. A storage medium storing a program to be executed by control means in a game device in which a game progresses according to an input speed and accuracy of typing by a player for specified words, wherein an object and a specified word attached to the object for promoting a player to input typing of the specified word are displayed in accordance with the execution of the program by the control means, and wherein the displayed, specified word is attached with alphabetical characters indicating the reading of the specified word, if alphabetical characters input by the player corresponds to any of different combinations of alphabetical characters indicating the reading of the specified word, the alphabetical characters input by the player and the alphabetical characters indicating the reading of the specified word are judged to be matching, and when a same specified word is displayed in an operation instruction display region polygon at a subsequent juncture, the alphabetical characters input by said player are set as the alphabetical characters indicating the reading of said specified word.

17. The storage medium storing a program according to claim 16, wherein a table of difficulty level numbers corresponding to kana characters is provided, and the program executed and controlled by said control means performs control in such a manner that a difficulty level of said specified word is taken as the number given by summing the difficulty level numbers corresponding to the respective kana characters which form the reading of the specified word.

18. The storage medium storing a program according to claim 17, wherein in development of the game, if the typing input made by the player with respect to a specified word having a reading of a first difficulty level number is correct, then the specified word displayed subsequently is selected at random from a group of specified words having a difficulty level number that is not smaller than said first difficult level number.

19. The game device according to claim 6, wherein the respective first alphabetical characters of the alphabetical characters indicating readings of the specified words displayed on the operation instruction display region polygons corresponding to the respective plurality of object display images, are mutually different.

20. The storage medium storing a program according to claim 14, wherein the respective first alphabetical characters of the alphabetical characters indicating readings of the specified words display on the operation instruction display region polygons corresponding to the respective plurality of object display images, are mutually different.

* * * * *